(12) United States Patent
Eliav et al.

(10) Patent No.: US 9,731,514 B2
(45) Date of Patent: Aug. 15, 2017

(54) METHOD AND APPARATUS FOR PRINTING ON A DRINK

(71) Applicant: STEAM CC LTD., Petah Tikva (IL)

(72) Inventors: Eyal Eliav, Tel Aviv (IL); Yossi Meshulam, Kochav Yair (IL); Marc Van Dyke, Beit Shemesh (IL)

(73) Assignee: STEAM CC LTD., Petach Tikya (IL)

( * ) Notice: Subject to any disclaimer, the term of this patent is extended or adjusted under 35 U.S.C. 154(b) by 0 days.

(21) Appl. No.: 15/191,465

(22) Filed: Jun. 23, 2016

(65) Prior Publication Data

US 2017/0066252 A1    Mar. 9, 2017

Related U.S. Application Data

(60) Provisional application No. 62/183,695, filed on Jun. 23, 2015.

(51) Int. Cl.
*B41J 3/407* (2006.01)
*G06Q 30/06* (2012.01)
(Continued)

(52) U.S. Cl.
CPC .............. *B41J 3/4073* (2013.01); *B41J 2/01* (2013.01); *G06Q 30/0601* (2013.01);
(Continued)

(58) Field of Classification Search
CPC ....... B41J 2/01; B41J 3/4073; G06C 30/0601; G06C 30/0603; G06C 30/0631; G06C 30/0635; G06C 30/60; G07F 13/065
See application file for complete search history.

(56) References Cited

U.S. PATENT DOCUMENTS

| | | | | |
|---|---|---|---|---|
| 4,961,533 A | * | 10/1990 | Teller | B67D 1/06 177/25.19 |
| 6,250,545 B1 | * | 6/2001 | Mazzarolo | B65D 81/3876 220/592.17 |

(Continued)

*Primary Examiner* — Anh T. N. Vo
(74) *Attorney, Agent, or Firm* — Marc Van Dyke; Fourth Dimension IP

(57) ABSTRACT

A method and printing device of providing a customized drink and printing on a current drink through an ink-jet printer and computer programs can be configured to perform actions by instructions when executed by data processing apparatus. The printing device includes a mapped drink-code database specifying a map for a plurality of drink-printing codes between, a respective combination of a respective drink-printing-code-specific target image to be printed by the ink-jet printer, respective drink-printing-code-specific target drink property-data describing contents of a respective target-drink and container by database, analysis circuitry for computing a drink-match parameter between, property-data of the current drink sensed by the sensor(s), displaying a drink-property-heterogeneous menu including the plurality of drink-printing codes on the display-screen, receiving a user-selection of one of the drink codes to thereby user-specify, according to the mapped drink-code database, a target-image and target-drink property-data, and a device controller for responding to the user drink-code selection, in accordance with content of the mapped drink-code database, output of the sensor(s) and output of the analysis circuitry.

5 Claims, 26 Drawing Sheets

(51) Int. Cl.
*B41J 2/01* (2006.01)
*G07F 13/06* (2006.01)

(52) U.S. Cl.
CPC ..... *G06Q 30/0603* (2013.01); *G06Q 30/0631* (2013.01); *G06Q 30/0635* (2013.01); *G07F 13/065* (2013.01)

(56) References Cited

U.S. PATENT DOCUMENTS 7,513,412 B2 *  4/2009  Benedetti ............ A47J 31/3623
                                              235/375
7,908,823 B2 *  3/2011  Edmunds ............... B65D 41/22
                                              150/154
8,307,303 B2 * 11/2012  Takahashi .......... G06Q 30/0601
                                              705/15

* cited by examiner

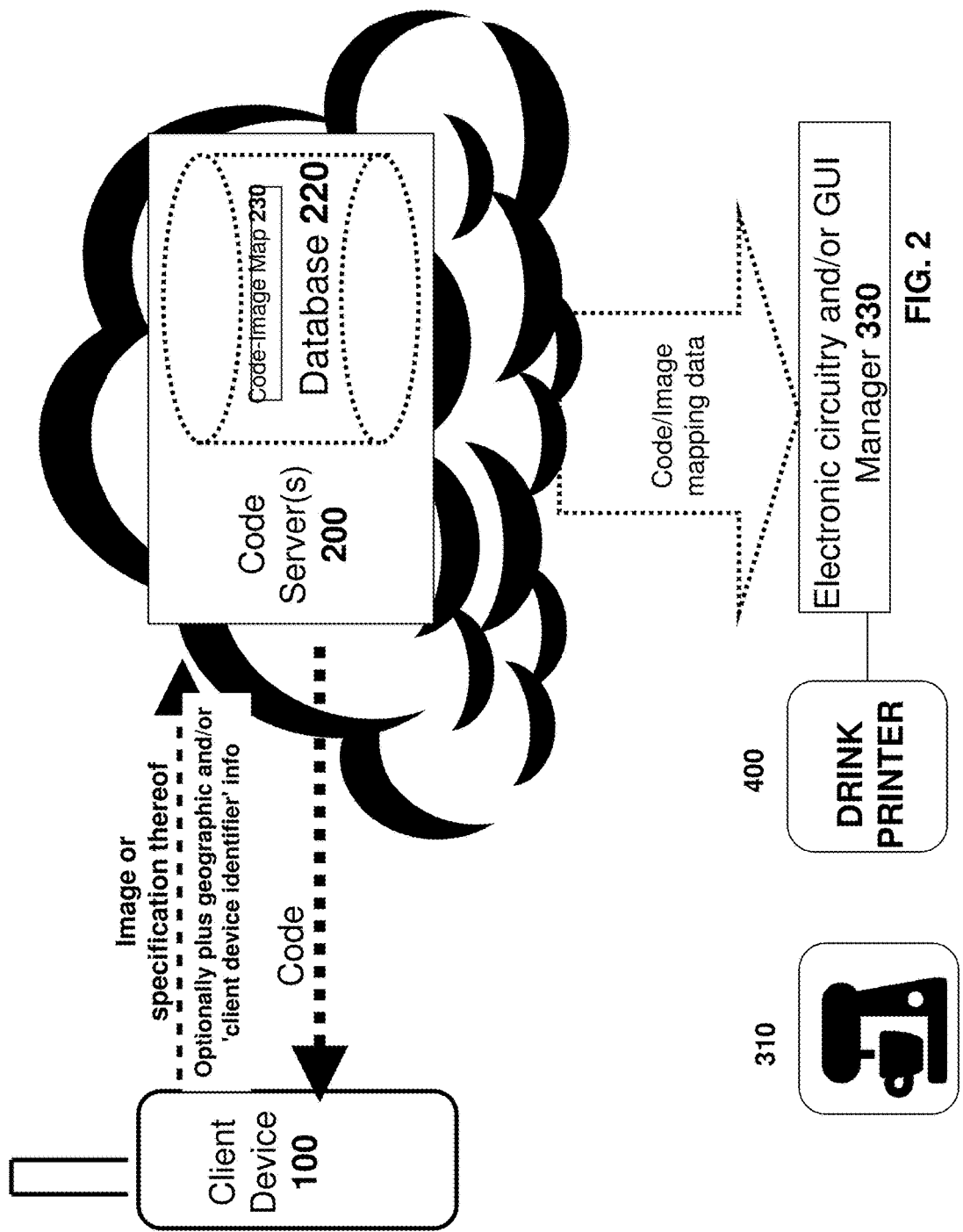

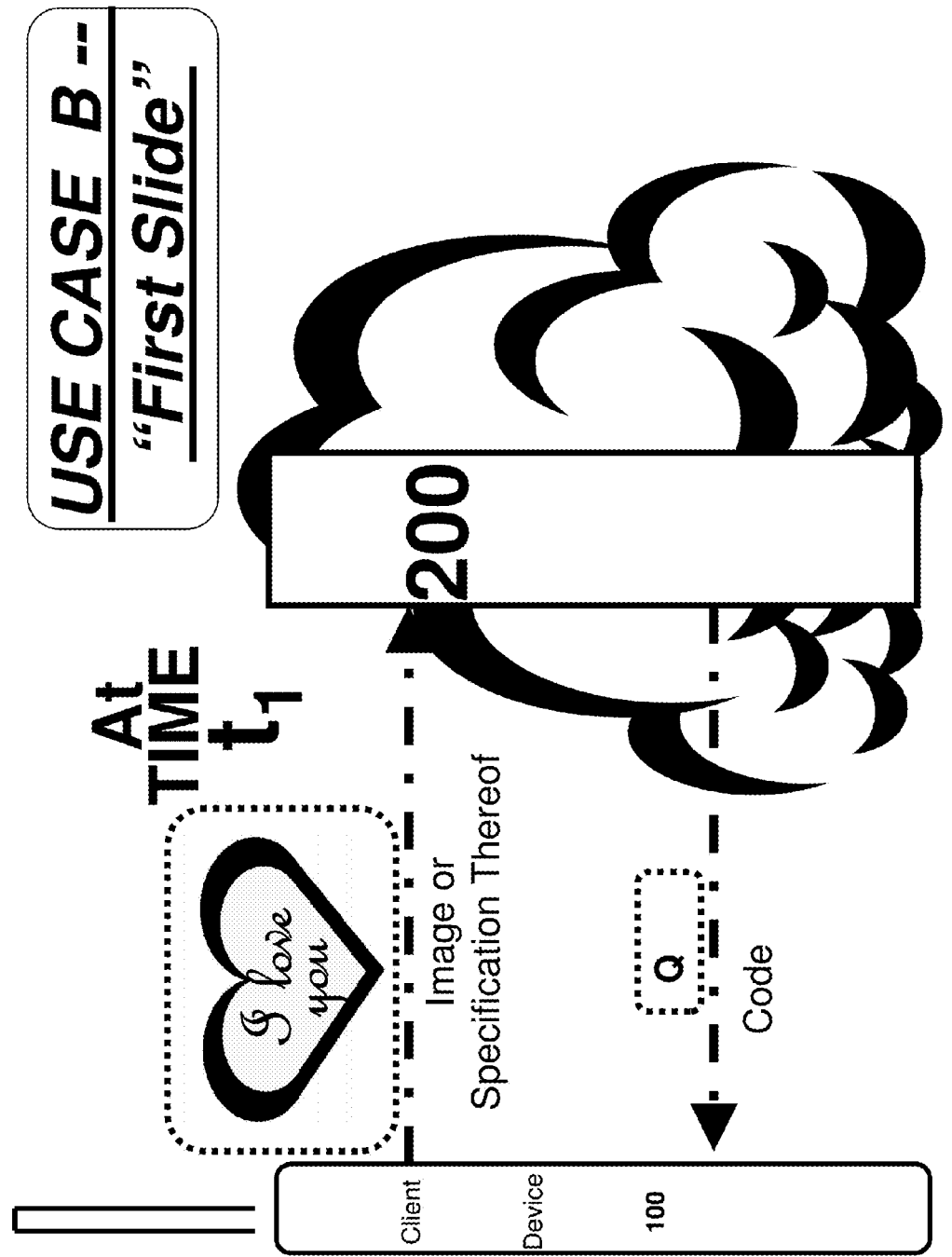

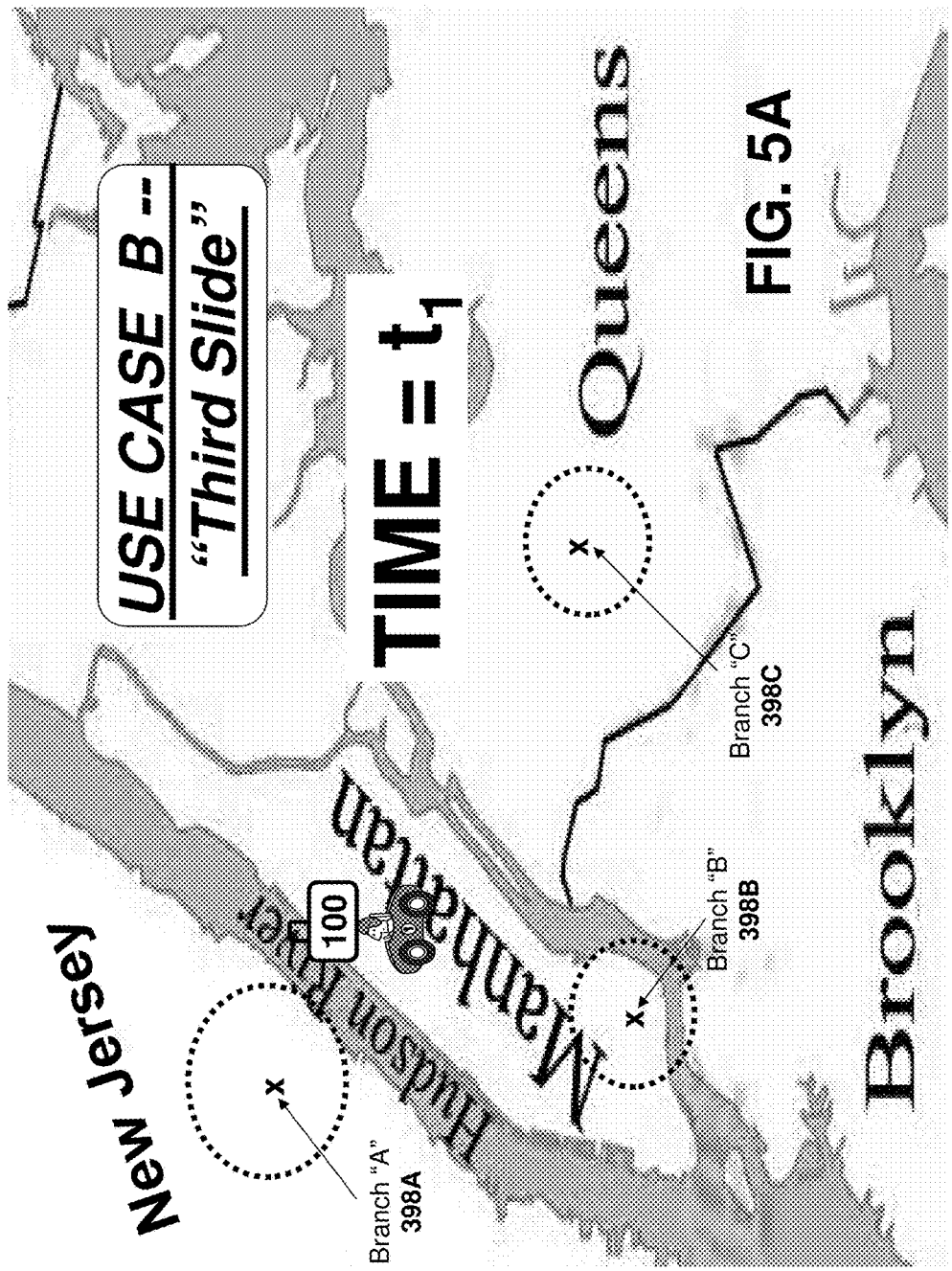

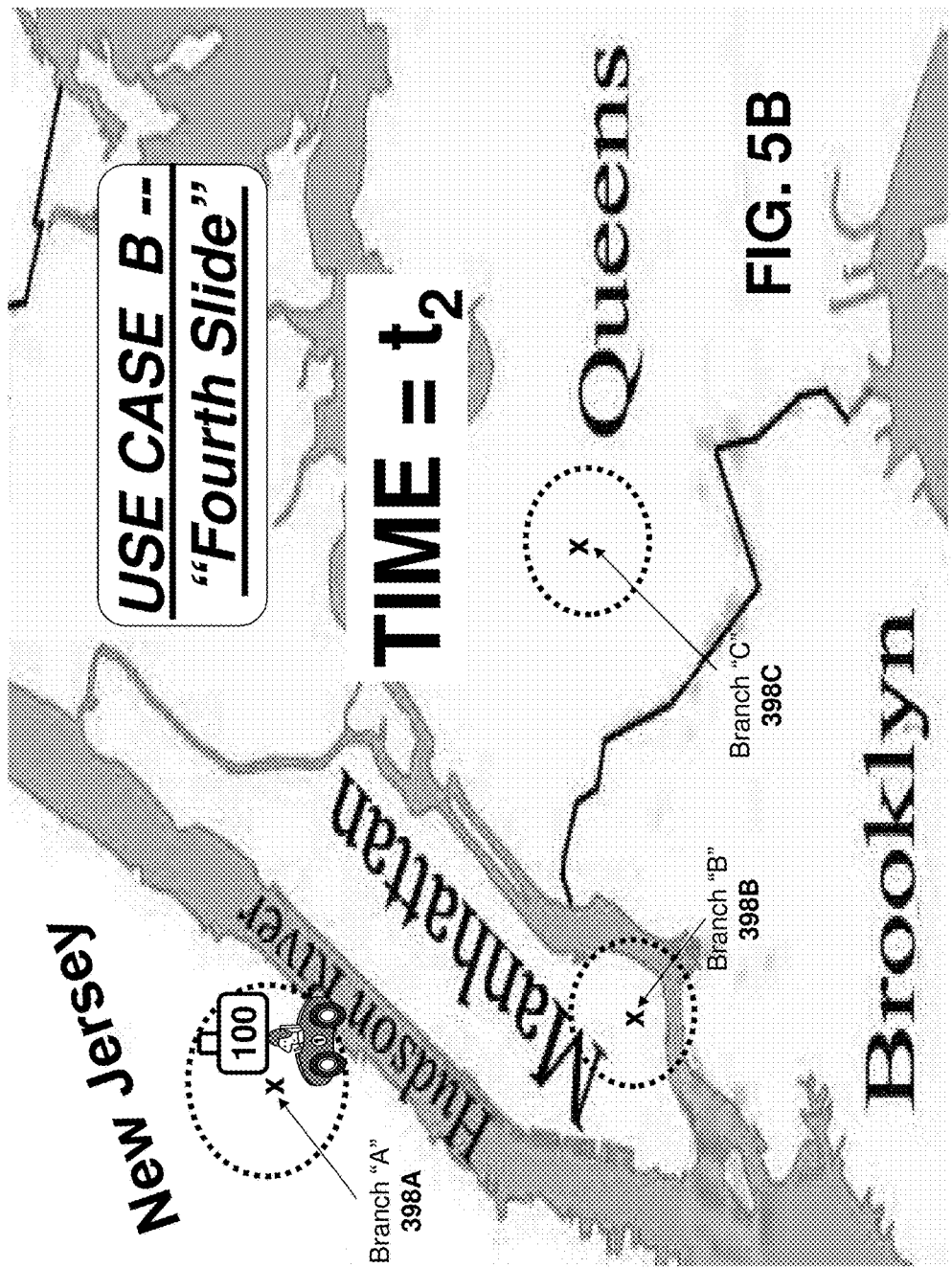

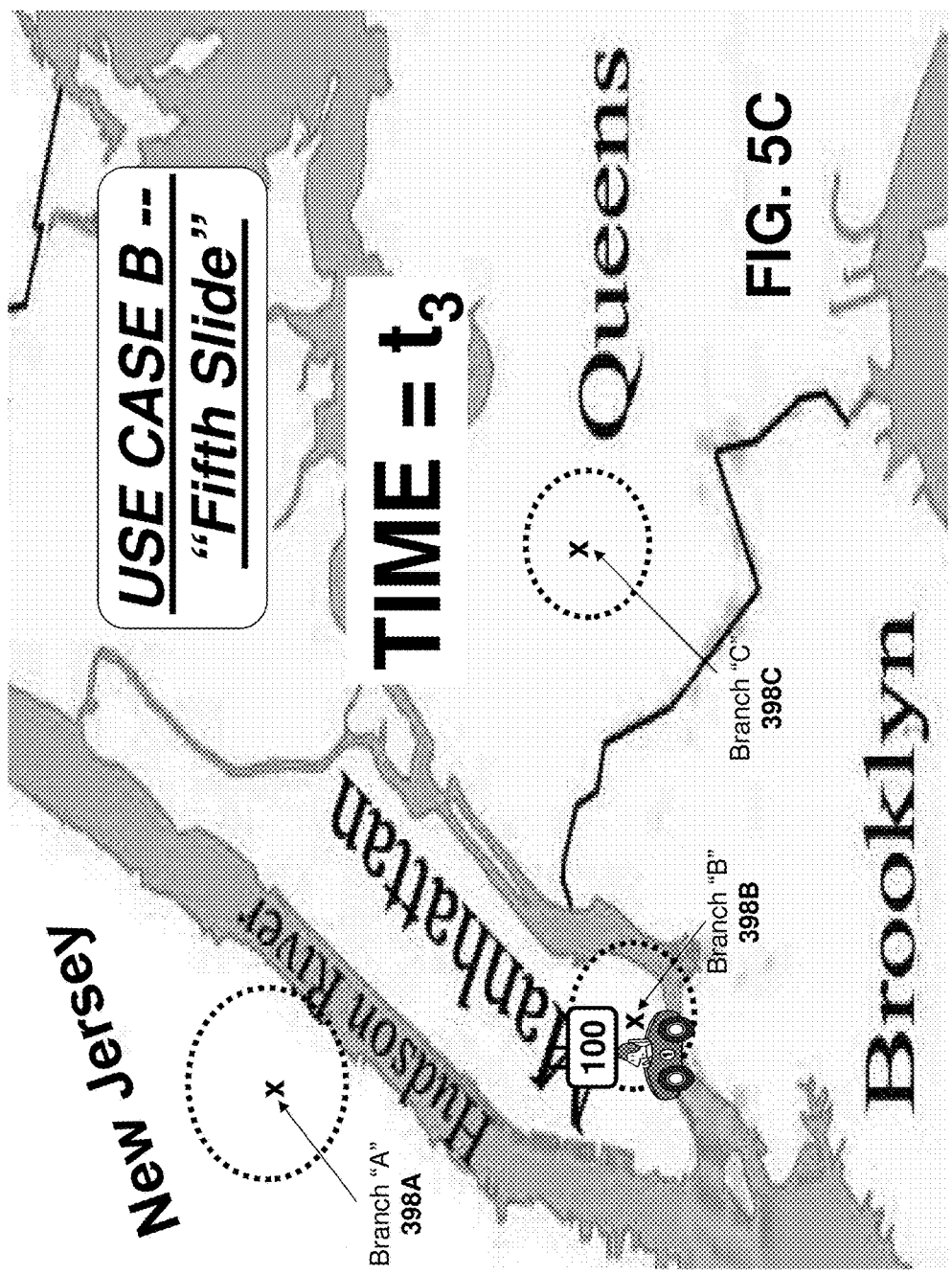

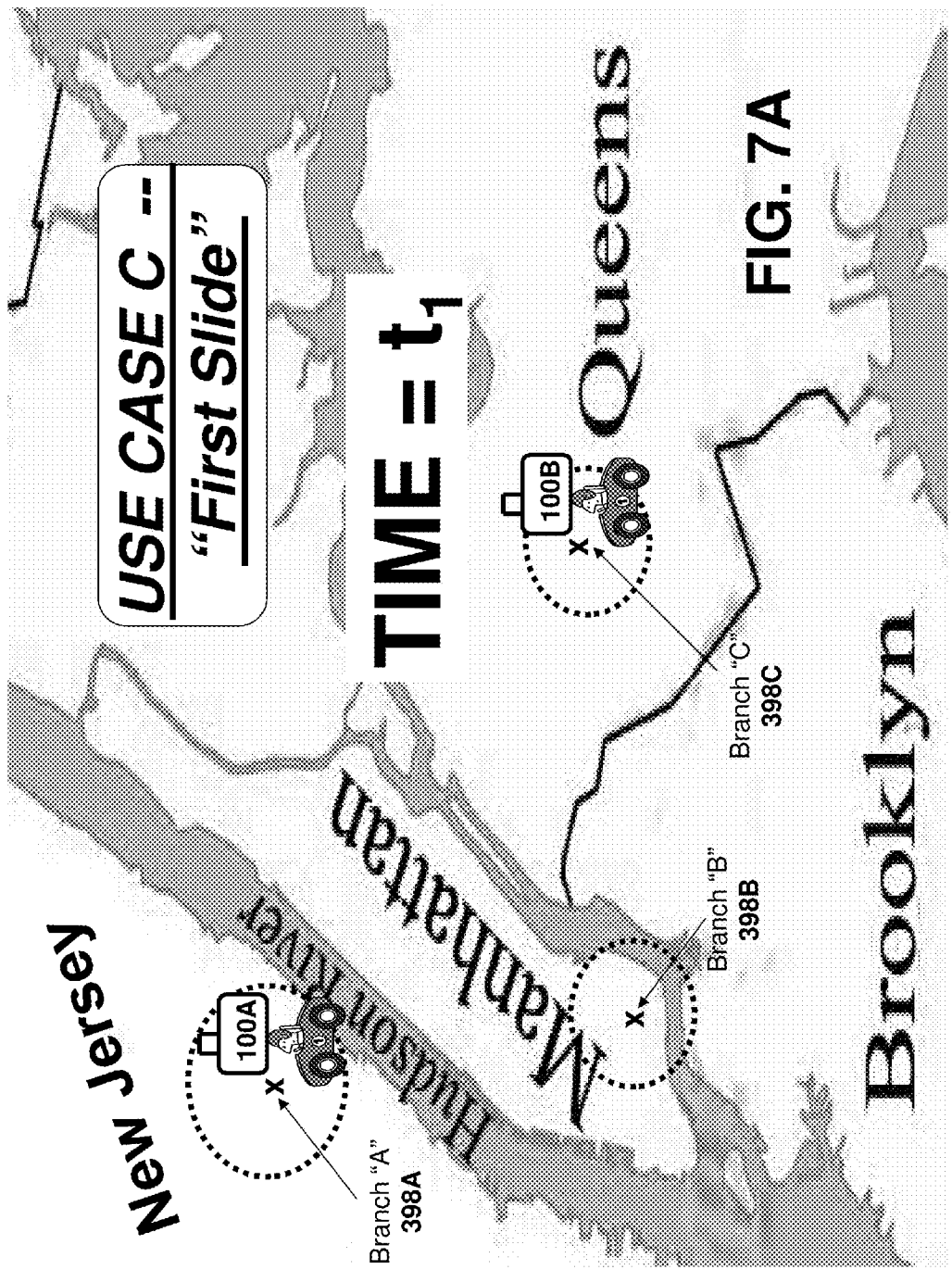

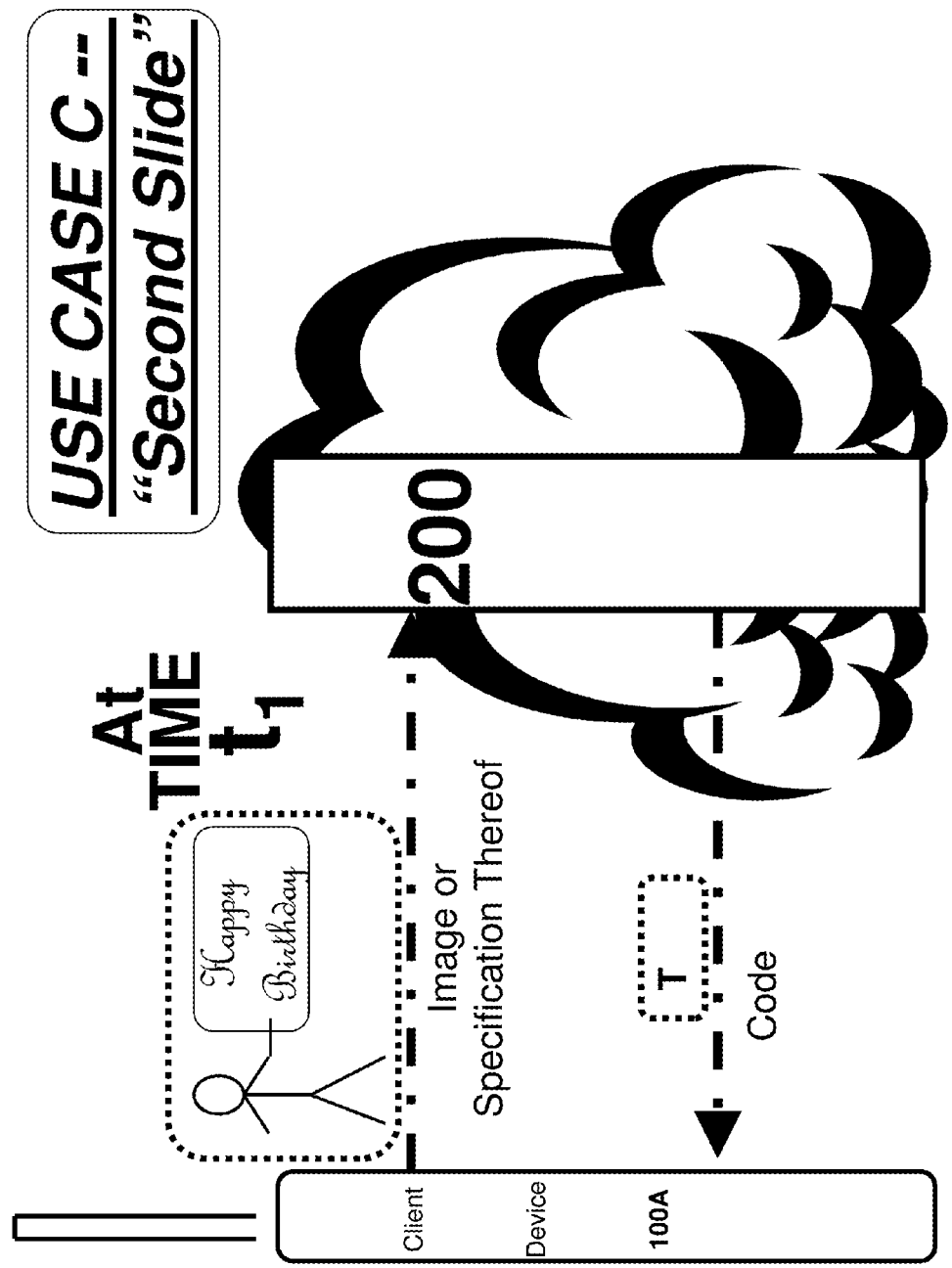

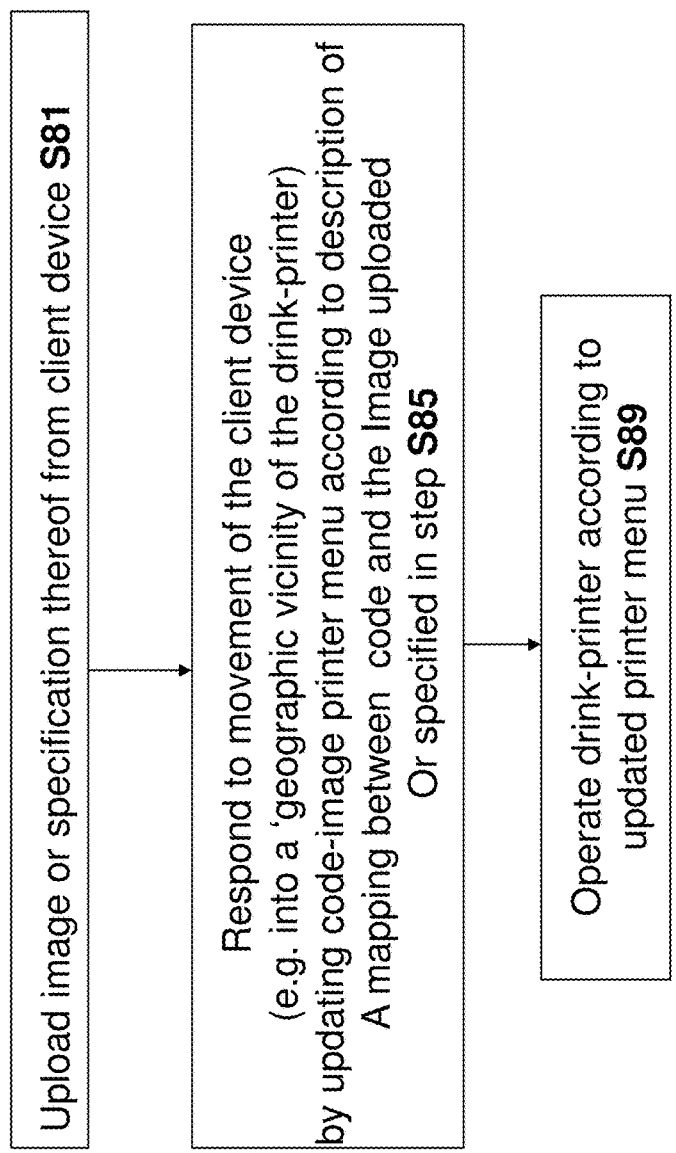

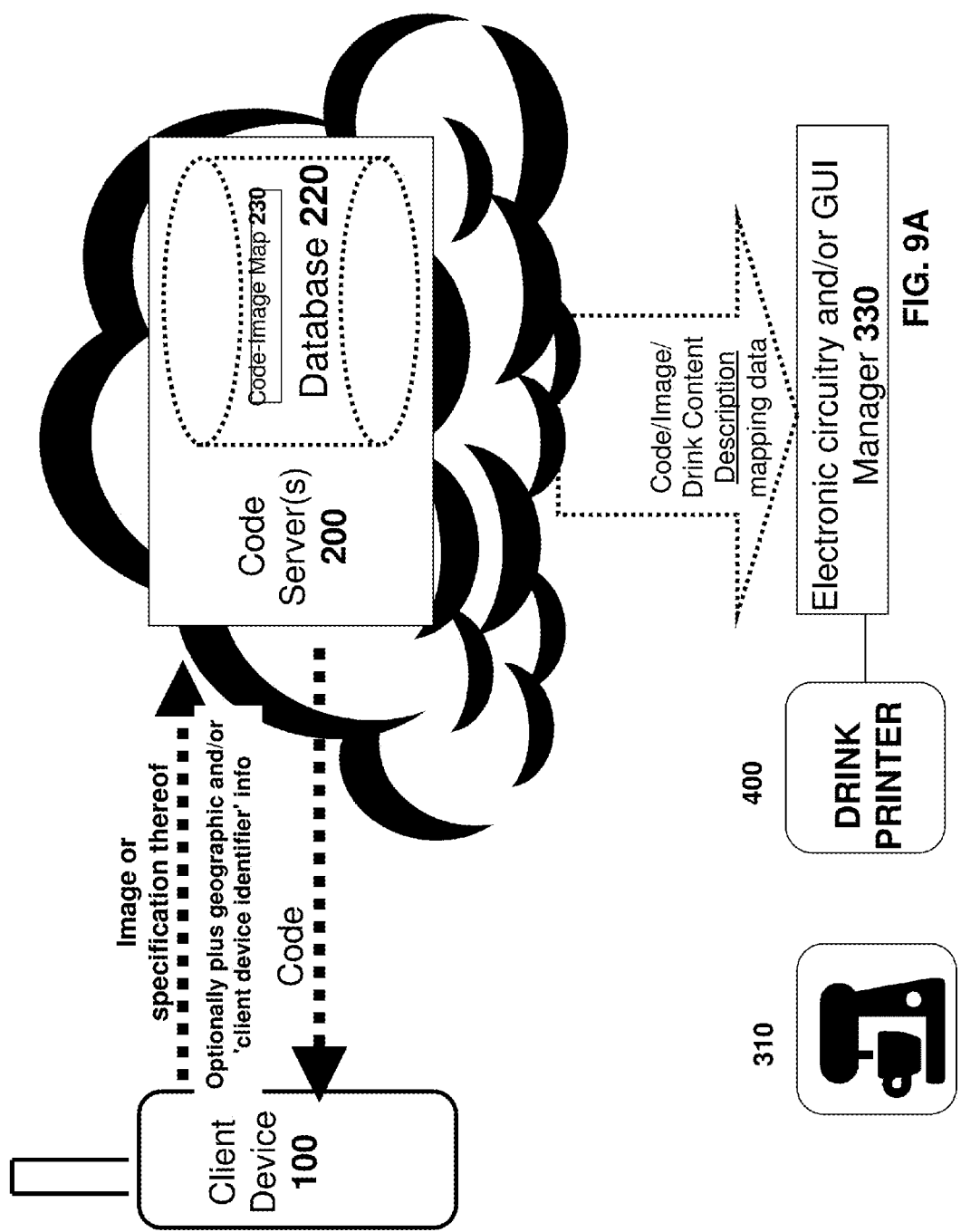

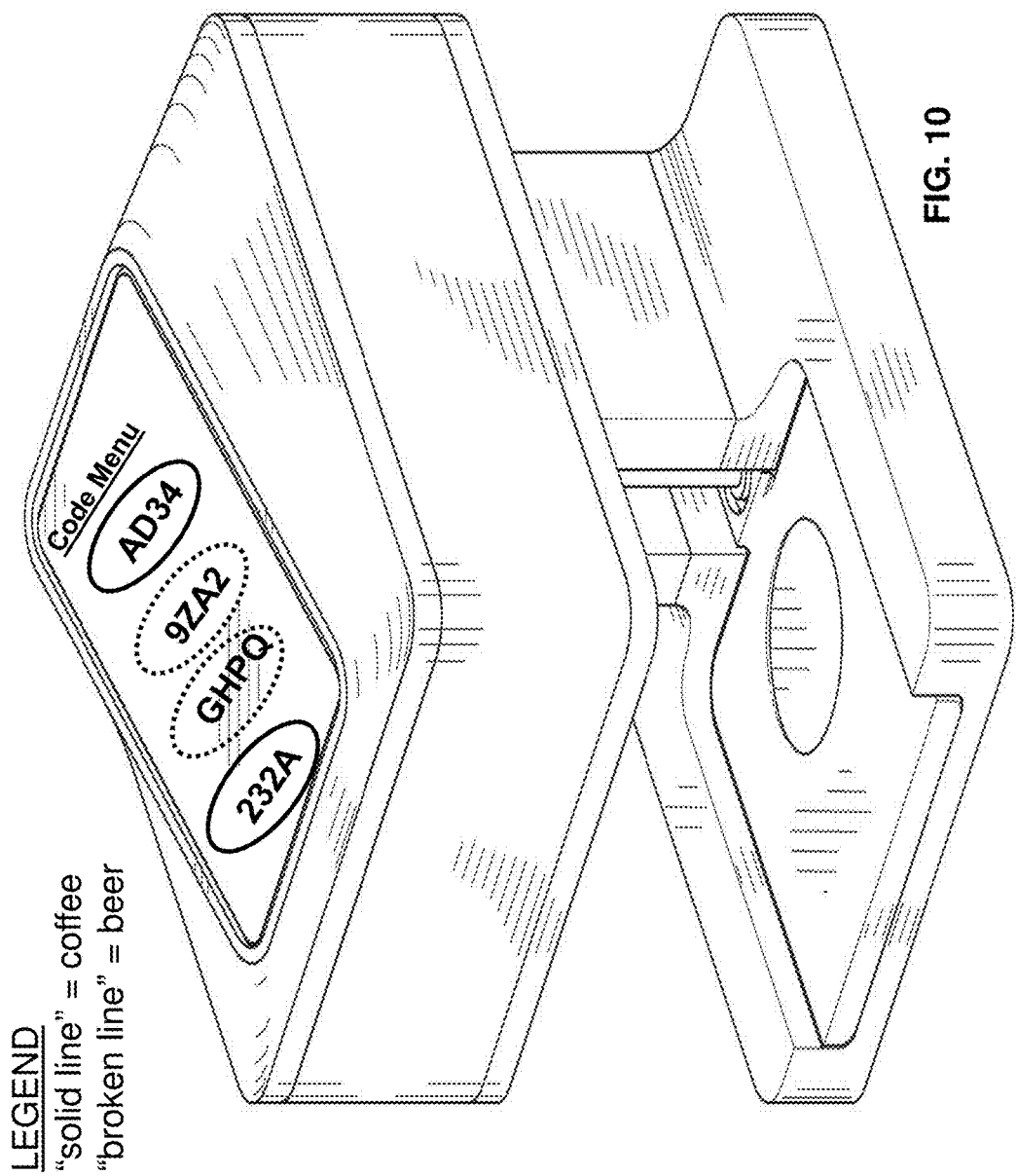

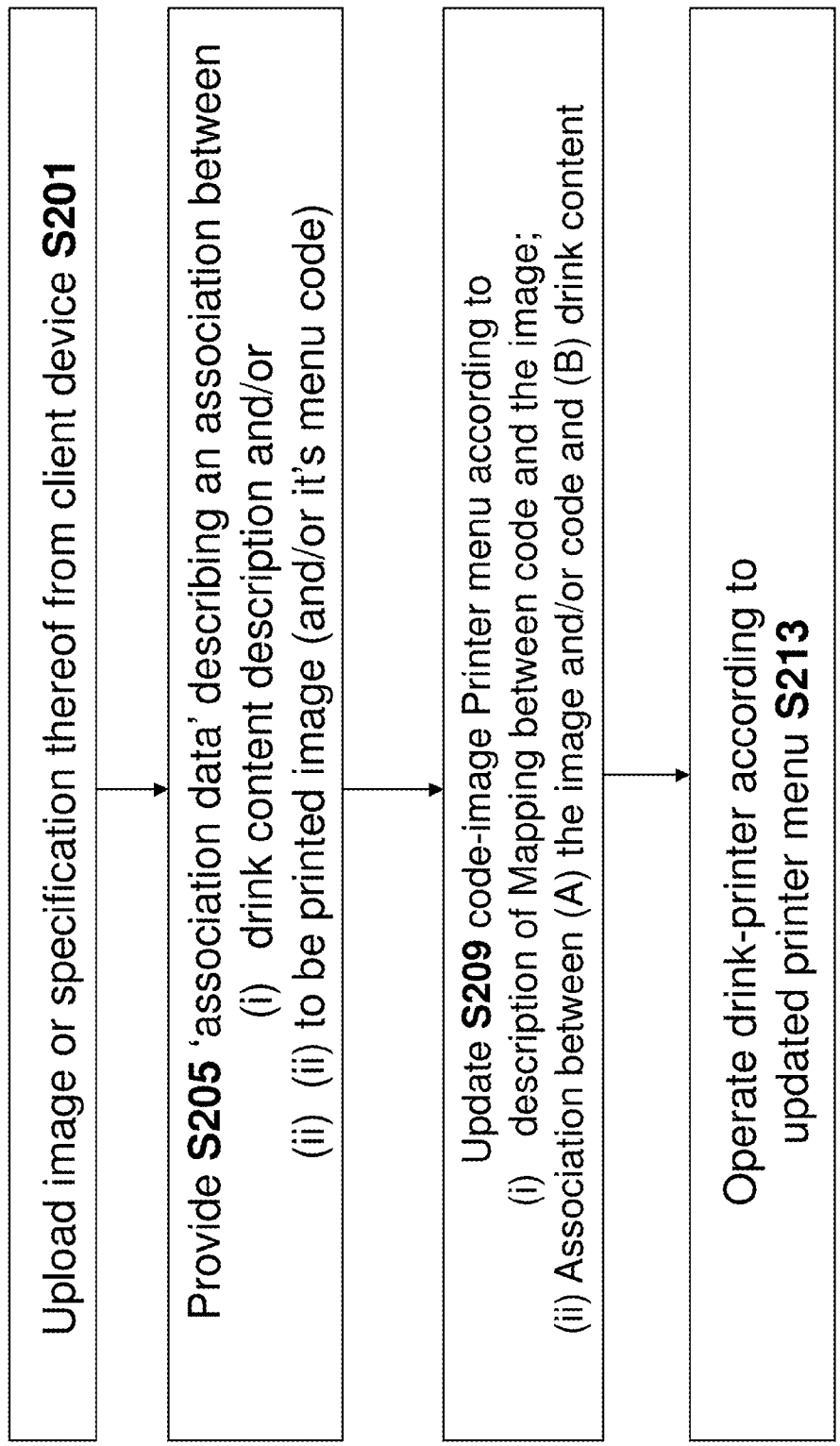

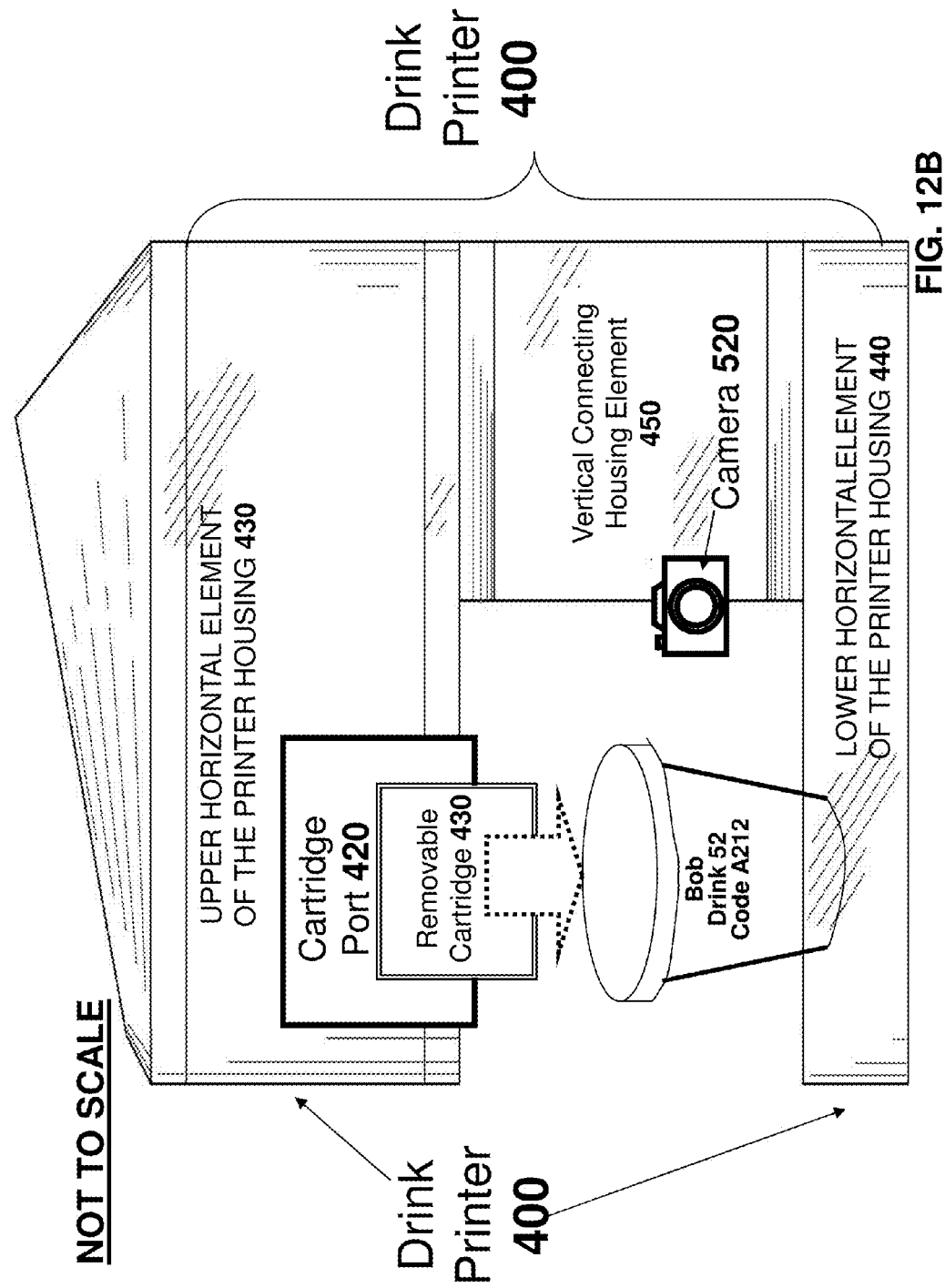

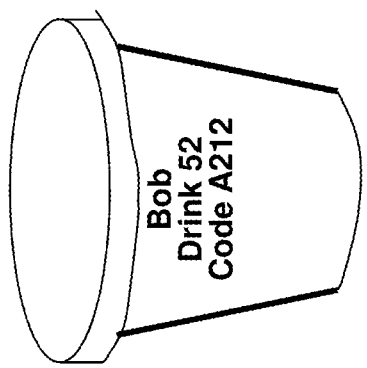
FIG. 12C

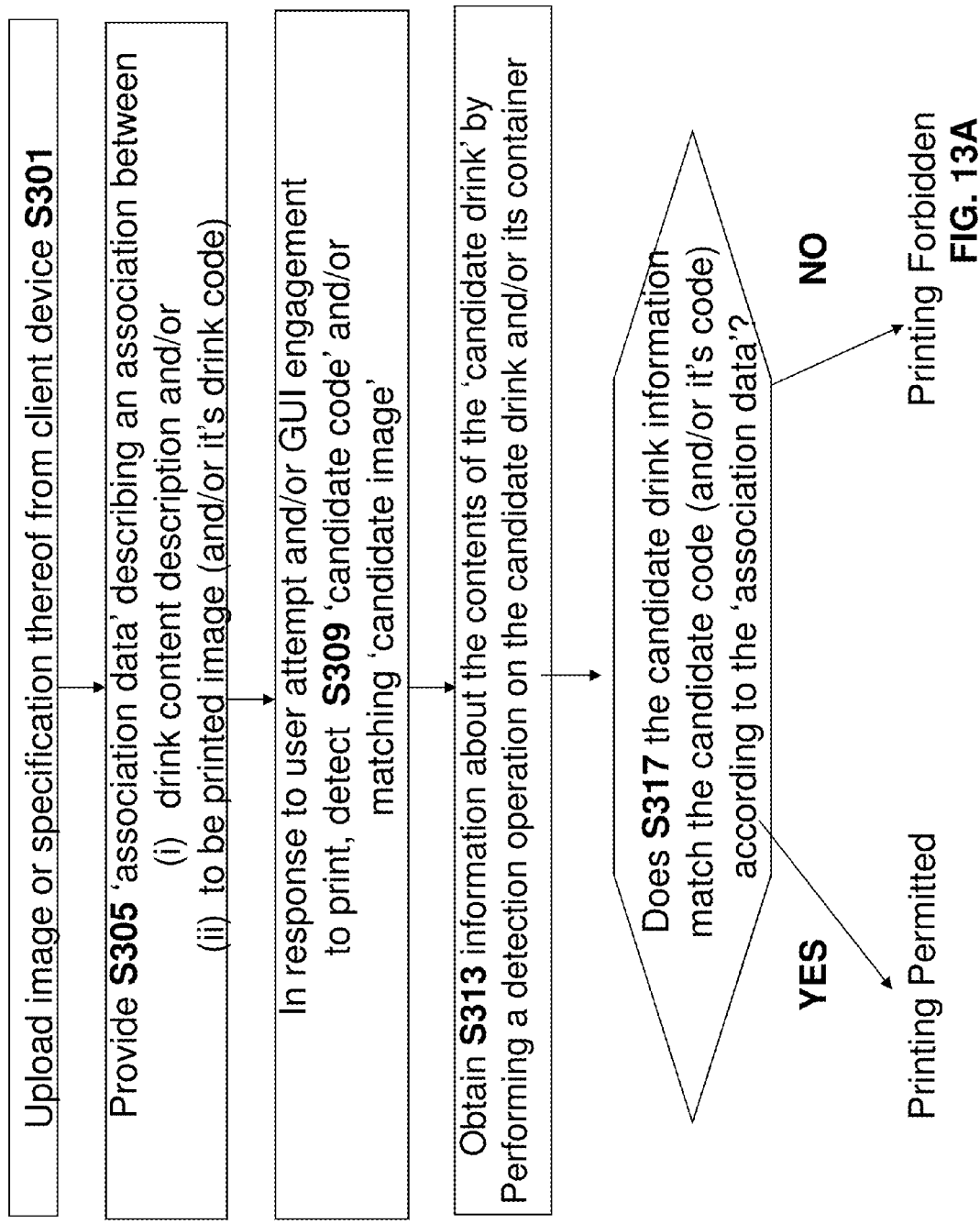

METHOD AND APPARATUS FOR PRINTING ON A DRINK

SUMMARY OF EMBODIMENTS

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a printing device for printing on a current drink including: a. a tray upon which the current drink rests. The printing device also includes b. an ink-jet printer to downwardly ink-jet droplets of ink towards the tray to print. The printing device also includes an image on the drink supported by the tray; c. a display-screen, d. one or more sensor(s) for acquiring current-drink property-data describing the current drink currently supported by the tray. The printing device also includes e. a mapped drink-code database specifying a map for a plurality of drink-printing codes, between. The printing device also includes i. each displayed drink-printing code of the plurality of drink-printing codes. The printing device also includes ii. a respective combination of (i) a respective drink-printing-code-specific target-image to be printed by the ink-jet printer; and (ii) respective drink-printing-code-specific target-drink property-data describing contents of a respective target-drink and/or its container; f. analysis circuitry for computing a drink-match parameter between. The printing device also includes i. property-data of the current drink sensed by the sensor(s). The printing device also includes ii. property-data of one or more of the target drinks specified by the database; g. a user-interface for. The printing device also includes i. displaying a drink-property-heterogeneous menu including the plurality of drink-printing codes on the display-screen. The printing device also includes ii. receiving a user-selection of one of the drink codes to thereby user-specify, according to the mapped drink-code database, a target-image and target-drink property-data; h. a device controller for responding to the user drink-code selection, in accordance with content of the mapped drink-code database, output of the sensor(s) and output of the analysis circuitry, by printing the user-interface-specified target-image onto an upper surface of the current drink in a manner that is contingent upon the drink-match parameter that is specific to the combination of. The printing device also includes i. the user-specified target-drink property-data as specified via the user-interface. The printing device also includes ii. the current drink property-data as sensed by the sensor(s). Other embodiments of this aspect include corresponding computer systems, apparatus, and computer programs recorded on one or more computer storage devices, each configured to perform the actions of the methods.

Implementations may include one or more of the following features. The system where the sensor is an image sensor configured to acquire a digital image of an outer wall of a container of the current drink resting on the tray. The system where the analysis circuitry is configured to subject the acquired digital image to optical-character-recognition (ocr) analysis derive therefrom the target-drink property-data. Implementations of the described techniques may include hardware, a method or process, or computer software on a computer-accessible medium.

One general aspect includes a printing device for printing on a current drink including: a. a tray upon which the current drink rests. The printing device also includes b. an ink-jet printer to downwardly ink-jet droplets of ink towards the tray to print. The printing device also includes an image on the drink supported by the tray; c. a display-screen. The printing device also includes d. a mapped drink-code database specifying a map for a plurality of drink-printing codes, between. The printing device also includes i. each displayed drink-printing code of the plurality of drink-printing codes. The printing device also includes ii. a respective combination of (i) a respective drink-printing-code-specific target-image to be printed by the ink-jet printer; and (ii) respective drink-printing-code-specific target-drink property-data describing a contents of respective target-drink and/or its container; e. a user-interface for. The printing device also includes i. displaying a menu including the plurality of drink-printing codes drink-property-heterogeneous on the display-screen such that each drink code is displayed in a manner specific to the respective target-drink property-data associated therewith. The printing device also includes. The printing device also includes ii. receiving a user-selection of one of the drink codes to thereby user-specify, according to the mapped drink-code database, a target-image. The printing device also includes f. a device controller for responding to the user drink-code selection, in accordance with content of the mapped drink-code database, output of the sensor(s) and output of the analysis circuitry, by printing the user-interface-specified target-image onto an upper surface of the current drink. Other embodiments of this aspect include corresponding computer systems, apparatus, and computer programs recorded on one or more computer storage devices, each configured to perform the actions of the methods.

One general aspect includes a method of providing a customized drink by a plurality of drink-manufacturing machines, each drink-manufacturing machine deployed at a different respective location and including and/or being locally coupled to a different respective display-screen, the method including: a. maintaining, in computer memory, a code-image map between code image-keys and digital graphical images b. in response to an uploading from a user-terminal, of a digital graphical image or a specification thereof. The method also includes a. updating the code-image map to include a mapping between (i) a code-image key specific to the digital graphical image and (ii) uploaded digital graphical image of specification thereof and optionally an identifier of the user-terminal. The method also includes b. sending the code image key to the user terminal. The method also includes c. monitoring a location of the user-terminal; d. in accordance with the results of the monitoring, sending menu-command information to each of the drink-manufacturing machines to regulate the contents of a code-menu on each of the drink-manufacturing-machine-local screens such that. The method also includes i. in response to a decrease in a distance between given one of the user terminals and a given one of the drink-manufacturing machines, adding or promoting a code image-key resident in the user terminal to or within a menu of the given one of drink-manufacturing machines. The method also includes ii. in response to an increase in a distance between given one of the user terminals and a given one of the drink-manufacturing machines, removing or demoting a code image-key resident in the user terminal from or within a menu of the given one of drink-manufacturing machines. The method also includes e. for each of the drink manufacturing machines, in response to a user-selection of one of the drink codes, printing on a drink its associated a target-image as defined by a code-image map. Other embodiments of this aspect include corresponding computer systems, apparatus, and computer programs recorded on one or more computer storage devices, each configured to perform the actions of the methods.

BRIEF DESCRIPTION OF THE DRAWINGS

FIGS. 1A-1B, 2, 9A-9B, 10, 12A-12C describe a drink printing system or portions thereof.
FIGS. 3, 4, 5A-5C, 6A-6C describe used case B.
FIGS. 7A-7D describe used case C.
FIGS. 8A-8B, 11 and 13A-13B are flow charts of methods according to some embodiments of the invention.

DETAILED DESCRIPTION

Definitions

Figure 1A:
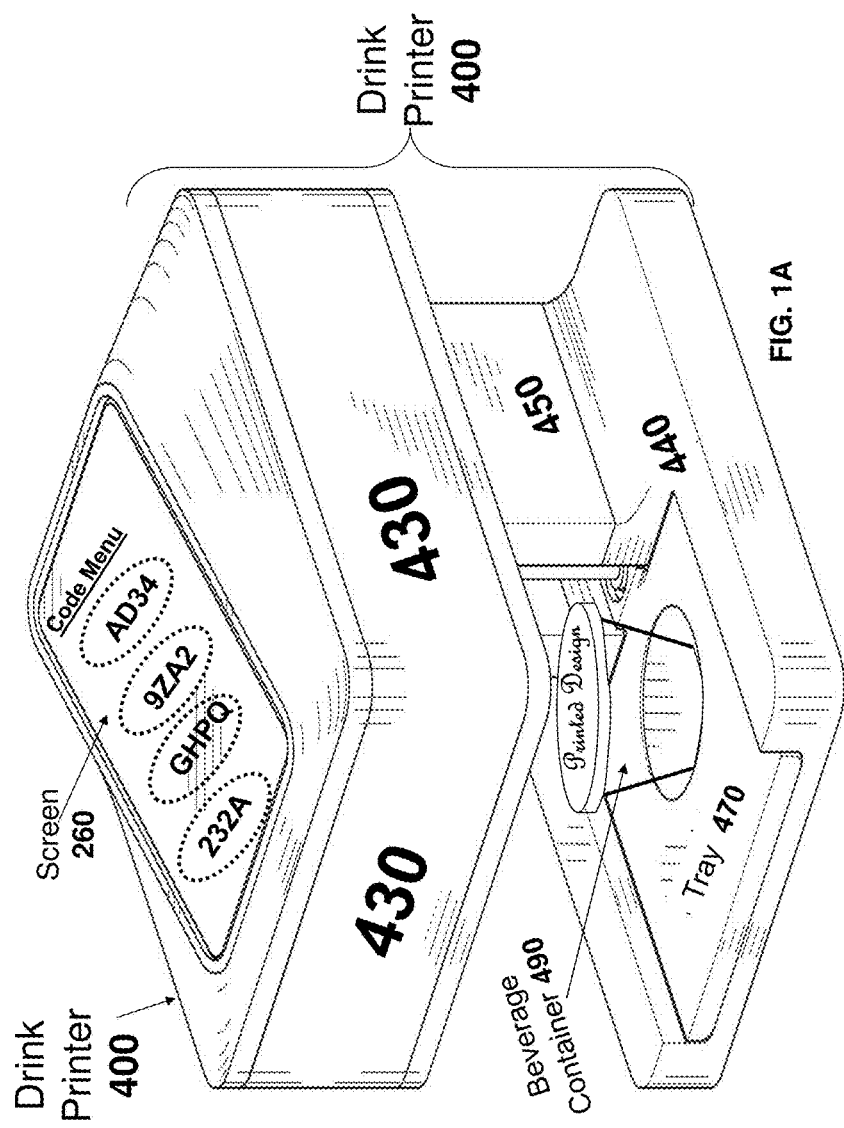

Within this application the following terms should be understood to have the following meaning:

A) drink—contents (i.e. including a fluid) within a container, preferably having an upper surface that is foamed and/or frothed. The term 'drink' or 'beverage' are used interchangeably. Examples of 'drinks' or 'beverages' include but are not limited to (i) 'coffee' and variations thereof (e.g. cappuccino) and (ii) beer. The container may have a generally cylindrical form-factor and may be, for example, a 'cup' or a 'glass.' A 'drink' includes both (i) contents of the drink and/or (ii) a container in which the material resides. A 'size' of the drink may relate to any combination of (i) a 'height' of the drink' or (ii) a measure of a rim of the container—.e.g. a circumference or a diameter or a radius.

B) drink-printing machine—a machine including an ink-jet printer and configured to print designs (e.g. including photographs or other graphics) onto an upper surface of a drink. In some embodiments, the drink-printing machine includes a reservoir of edible ink—e.g. coffee-based (e.g. for printing on coffee-based beverages) or malt-based (e.g. for printing on beer). As is known in the art of ink-jet printing, the drink-printing machine C) 'electronic circuitry' or 'circuitry'—any hardware (e.g. digital and/or analog electronics), or software or combinations thereof. In some embodiments, 'circuitry' includes a digital computer. "Analysis circuitry" is electronic circuitry configured to perform a data-analysis function. "Memory" or 'storage" (used interchangably) refers to volatile (e.g. RAM) and/or non-volatile (e.g. flash or magnetic medium) computer storage. "Circuitry" or 'memory" may be local to a given device (or locally-coupled devices) or may be non-locally distributed.

D) A device controller—any combination of electronic components, software components and/or mechanical components required to perform a function—e.g. to cause an ink-jet printer to print a specific pattern on an upper surface of a specific drink.

E) a drink-generating machine—a machine for providing a drink within a container. For example, the drink-generating machine may be a simple dispenser or may be configured to dispense multiple ingredients at relative quantities or at specific temperatures. In some embodiments, a drink-generating machine may include a frother or may be configured to agitate liquids to form (or modifty) bubbles and/or foams therefrom.

F) A drink production machine is either a 'drink-generating machine' or a 'drink-printing machine" or a hybrid therebetween. A 'hybrid' may be a single machine configured to both 'provide' (e.g. generate) the drink and to print on an upper surfac eof the drink.

G) a 'machine-user'—this is a user of a drink-production machine—e.g. a barista. The 'machine-user' is not required to be the same person as the end-customer (i.e. who will consume the drink). Unless specified otherwise (or clear otherwise from the context), a 'user' refers to a 'machine-user.'

H) user-terminal—a digital computer device operated by a user—typically having an input device (e.g. keyboard or touch-screen) a display screen and a communication module (e.g. WiFi or cellular). One example of a 'user-terminal' is a mobile phone—e.g. a cell phone.

I) a 'code' or 'drink code' or 'drink-code'—a series of symbols—e.g. displayed horizontally in spatial sequence. One example of a 'code' is a 'textual code' (e.g. comprising letters and/or calligraphy (e.g. Chinese or Japanaese or Korean) characters for far-Eastern languages) and/or numbers and/or punctuation symbols. However, the code may also include emoticons or other symbols.

As discussed below, the drink-code may explicitly appear on a user interface and a user engagement of the drink-code may thus specify the image that the user wishes to print.

J) a subset—as is known in mathematics, a set is a subset of itself. If the 'subset' does not include all elements of the set, the 'subset' is a 'proper subset.' For the present document, a null set (or empty set) is not considered a 'subset.' A 'plurality of items' is one example of a 'set' of items.

K) 'Drink printing machines' typically include a platform (e.g. a tray) where one or more drinks may be placed. For example, this tray may be operatively coupled to an elevator for raising or lowering the tray—e.g. towards a print-head of an ink-jet printer. A 'current drink' is a drink in a position to have a design printed on an upper surface of the drink—e.g. a drink within a container resting on an elevatable tray of a drink printing machine.

L) "User interface" In some embodiments, a drink printing machine includes a 'user interface' (e.g. GUI) operative to receive user input and to print a pattern onto a drink in response to the user input. For example, there may be a plurality of 'candidate patterns' or 'candidate images' that could be printed onto drinks—e.g. stored in memory of the drink. In response to and based upon input received by a user via the user interface, the drink machine may print a selected one of the patterns or images upon a surface of a 'current drink.'

As mentioned above, the drink-codes may explicitly appear on a user interface and a user engagement of the drink-code may thus specify the image that the user wishes to print. For example, the drink print machine may include and/or be operatively linked to a user interface for selecting a one of the patterns (e.g. images or photographs to print)—e.g. a menu of drink codes may be displayed and the user may select one of the codes.

The drink-code may be associated (e.g. in some sort of map or data-structure) with an image to print—thus, by selecting a 'drink code' the user implicitly selects or 'specifies' an image to print.

M) "Target" (e.g. 'target image' or 'target drink')—When a user selects an image to print, this is a 'target image.' In some embodiments, the target image may be associated (i.e. in computer storage) with meta-data describing the 'target drink' to which the 'target image' is to be printed. For example, at some point a customer and/or user and/or machine and/or any other entity may specify "Print abc.jpeg to a large cappuccino." In this case, the 'target image' is acbjpeg and 'large cappuccino' is the target drink. In this example, if a 'target image' is associated with the 'large cappuccino' metadata then when the user 'specifies' (e.g. by selecting a drink-code from a menu where the selected drink-code is associated with the "target image") a target image, the user also implicitly selects a 'target drink'—e.g. that it is intended to print abc.jpeg onto a large cappuccino and not onto a beer or a small cappuccino.

N) 'drink property data' describes one or more of (i) contents of a drink and/or (ii) the container in which the drink resides. Examples of drink-contents properties include but are not limited to type of drink (i.e. alcoholic vs. non-alcoholic, coffee vs beer vs wine (e.g. sparkling wine)), temperature of the drink, properties (e.g. concentration, particle-size distribution) of particles within the drink, property(ies) of froth or foam at an upper surface of the drink (e.g. foam thickness, bubble size, viscosity, color), and drink color. Examples of drink-container property include (i) size of the drink container; (ii) symbols or codes or drawings or text on the drink container (e.g. drink sidewall); (iii) color of the drink container. For any embodiment referring to a 'drink property,' (i.e. generically), the drink property may in any embodiment refer to any specific drink property described herein.

In one specific example, the 'analysis circuitry' may, for example, compute a 'size' of the drink by edge detection—e.g. by a camera viewing the rim of the beverage container from above.

I) "Current drink property data' versus 'target drink property data'

I1) One example of 'drink property data' is 'current-drink property data' relating to a drink currently supported by a platform (e.g. elevatable tray) of the drink printing machine—current-drink property data may be sensed by a sensor (e.g. camera, weighing scale, chemical sensor, optical device other than a camera, thermometer (e.g. infra-red based) etc).

I2) Another example of 'drink property data' is 'target drink-property data.' Thus, if before the printing (e.g. and before the 'user' selection of a drink-code)) a drink-code and/or a drink-image may be associated (e.g. within the 'menu' presented on the screen) with a specific 'target drink.' For example, a customer may request to print a certain 'selfie' or other photograph onto a cappuccino drink. As discussed below, this request may come in stages—in one example, first the customer uploads the image or a specification thereof and only later does the customer specify the 'cappuccino.' In this example, a retail establishment (e.g. restaurant) may process different types of drinks on a single drink printer—i.e. the drink printer may be used both to print on coffee or on beer, or on different 'types' of drink beverages.

Thus, in this example, once a 'large cappuccino' is specified as a 'target drink,' the known properties (i.e. exactly or approximately) may be available in memory or storage—e.g. the size of the 'target drink,' chemical properties of the target drink (e.g. beer vs. coffee, etc), symbols or codes that are excepted to appear on a surface of container of the target drink (e.g. it is expected to write the word 'cappuccino' on the sidewall of the cup), etc—all of these are examles of 'target drink properties' "Target drink properties' may be properties of the content of the 'target drink' of the container.

As discussed below with reference to FIG. 13A, the target drink properties may be compared to 'current drink' properties before printing to make sure that the intended (or 'target') pattern is printed on the correct drink (i.e. and not 'accidentally printed on the 'wrong drink').

H) a 'drink-match parameter' describes whether or not two drinks are the same and/or the likelihood that they are the same. It can also describe a similarity between two drinks. In one example, the 'drink-match parameter' has a value 0 and 1 where '0' is a 'bad match' and 1 is a 'perfect match.' In this example, a 'drink-match parameter' between a 'small capuccino' and a large beer is 0.001; a 'drink-match parameter' between a 'small capuccino' and a large capuccino' is 0.6 and a 'drink-match parameter' between a 'small capuccino' and a medium capuccino' is 0.8.

The closer the value to 1 the more likely there is a match.

Figure 1B:
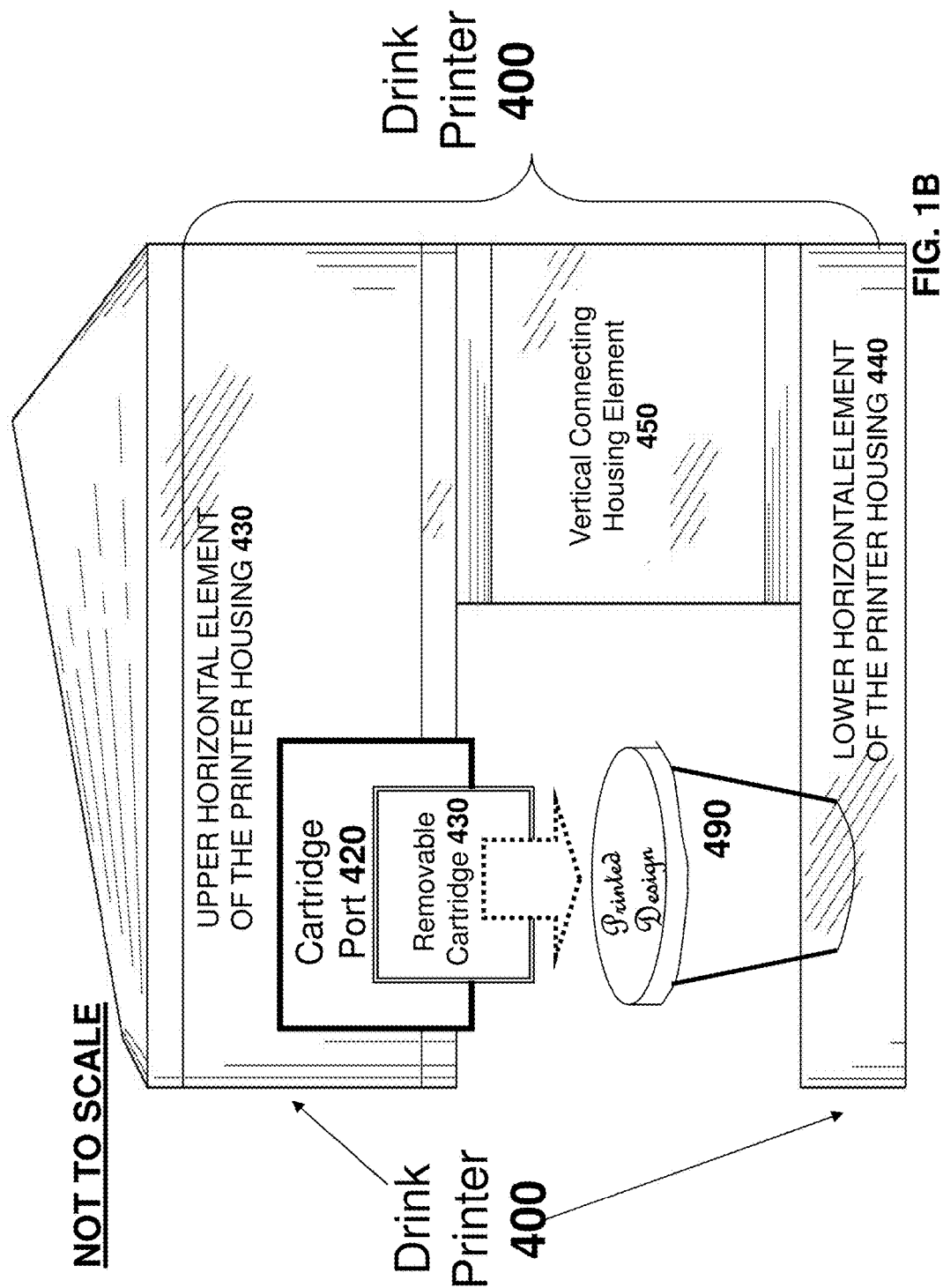

FIGS. 1A-1B illustrate a drink-printer device 400 operative to print designs (i.e. by droplet-deposition) on a surface of a beverage within beverage container 490 (e.g a cup). The printer device comprises a housing, a cartridge portion 420 within the housing, and a tray 470 (e.g. vertically elevatable to move up and down). As shown in FIGS. 1A-1B, the housing drink printer 400 includes an upper horizontal portion 430 above the beverage container 490 (i.e. when on tray 470), a lower horizontal portion 440 below container 490 and/supporting container 490, and a vertical connecting housing element 450 (e.g. supporting upper horizontal portion 430). For example, when the printer begins the print first container 490 is lifted up towards nozzle(s) of cartridge 430 by vertical motion of tray 470—e.g. the container 490 may be lifted by at least 5 cm or at least 10 cm.

The drink-printer device 400 (e.g. thermal ink-jet device) comprises a cartridge port 420. Removable cartridge (e.g. comprising a reservoir of edible ink—e.g. coffee based) is deployed to cartridge port 420. In some embodiments, drink printer 400 is a thermal inkjet printer. The downward block arrow in FIG. 1B represents ink droplet deposition to form a pattern on an upper surface of the beverage within container 490. The term 'drink printer' is a device to form a pattern on a surface of a beverage by droplet deposition. Typically, drink printers are configured so that the pattern is formed by lateral and longitudinal movement of ink-deposition nozzles (e.g. of cartridge 430). In some embodiments, the pattern applied to the upper surface of the beverage is formed solely by lateral and longitudinal motion of the nozzles while beverage (and container 490) are held stationary. The skilled artisan is referred to PCT/IL06/00851 filed Jul. 23, 2006 which published as WO2007013061, incorporated by reference in it's entirety. Different embodiments relate to any feature (or combination of features) combined with any feature (or combination features) disclosed in the present document.

Device 400 also includes display screen 260 (e.g. 'touch-screen')—e.g. deployed to and/or embedded within a housing of the drink printer 400 (e.g. upper portion 430 of the housing—e.g. an upper surface of upper portion 430). In some embodiments, screen 230 is slanted. The screen 260 has a user interface.

For example, a plurality of codes (e.g. textual codes) are displayed (e.g. simultaneously displayed) where each code is associated with a different image to print onto the beverage. Thus, in one example (see FIG. 1A), when the user engages code AD34 a first image (e.g. first .gif) is printed—e.g. a picture of an animal, when the user engages a second code 9ZA2 a second image (e.g. a second .gif) is printed (e.g. the script/cursive words "Printed Design") is printed, and so on.

Towards this end, some sort of mapping is electronically stored (e.g. in a location that is 'local' to printer 320 or in any other location). This map is between digital graphical images and codes (e.g. textual codes). The term 'graphical image' is used broadly to refer to images generated by computer graphics, photographs, text, or other content—a 'graphical image' may be provided as a .gif file, a .jpeg file, a .tiff file, a .pdf file, or any other data-object known in the art.

FIG. 3 illustrates a system where user(s) specify a desired image to print on a beverage using a client device 100. In one example, a menu of images may be displayed on a screen of client device. In another example, client device may include some sort of image-generating software for generating an image on the client device. In another example, client device may include an onboard camera (not shown) for acquiring an image of a scene. The image (or a specification thereof—e.g. the user selects an image from a plurality of digital graphical images located in the cloud) is uploaded to code server(s) 200 which assigns and/or maps a code (e.g. textual code) to the image to 'specify an association' (or mapping) between the textual code (e.g. generated by code server) and the user-provided (or specified) image provided and/or specified by client device 100. Optionally, code server 200 sends the code back to client device 100.

Code Server 200(s) may send code/image mapping (or 'association') data to drink printer 320 to electronic circuitry. For example, if a new code is generated by code server(s) and associated with the digital graphical image, code server(s) 200 may send a specification of a mapping between the digital graphical image (e.g. there may be a pre-determined bank of N images stored locally at drink printer 320 and the 'specification' may relate to 'Image number 262') and the textual code. In some embodiments, the actual image (e.g. a digital image) is sent from client device 100 to electronic circuitry and/or GUI manager 300 9e.g. by or via code server 200).

"Electronic circuitry" may include any software/executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture.

Thus, client device 100 specify digital images (e.g. according to user input) and subsequently (e.g. in response) a code 'matching' the digital image appears on display screen 260. The mapping betwee the image and the code (e.g. textual code) may be generated by coder server(s) 200.

Use Case A

In one use case, a user ("Robert") is in a coffee shop with his/her spouse and wants to print a photograph of the user together with his/her spouse on their drinks. The user operates client device 100 to specify the image to upload the photograph to code server(s) 200 which assigned a code (e.g. textual code) to the photograph image and sends the photograph along with the 'association data' to GUI manager 330. At that time, the text ("XYZ" for this example) appears (e.g. in response to the uploading of the photograph by client device 100) on the screen 260 of drink printer device 400.

At a later time, the user verbally places his/her order at the cashier within the coffee shop—he orally tells the cashier that s/he wants a large cappuccino and shows the display screen of his/her client device 100 which displays the code mapped to the image (e.g. the photograph of the two spouses) that was received by code server(s) 200.

The cashier then takes a disposable cup and on the outside of the cup writes "Robert" and "Large Cappuccino" and "XYZ") on the outside of the cup which is handed to the barista. The barista operates both drink manufacturing machine 310 (e.g. a coffee machine) which dispenses the contents of the drink into the container 290 and drink printer 400. First the barista reads the words Large Cappuccino on the cup and produces (using machine 310) a large cappuccino. Then the barista reads the text code "XYZ" and selects (e.g. from the menu of display screen 260) the "XYZ" option. When the user selects XYZ using the GUI of printer 400 the machine then prints the photograph of Robert and his/her spouse.

Another customer in the coffee shop named "Steve" may, at the same time that Robert uploads the photograph of him with his spouse, specify a 'Lion King' image from a bank of images stored in the crowd. Steve would receive a different code (e.g. "ABC") which would be mapped to the "Lion King" image (and not to the picture of Robert with his spouse). In response to Steve specifying the lion code image (i.e. uploading a specification of this image), the code "ABC" appears on the menu of display screen 260. Steve wishes to order a hot chocolate beverage. Steve simply tells the cashier that he desires a hot chocolate and specifies "ABC"—the cashier than writes on the cup "Steve" and "Hot Chocolate" and "ABC") on the outside of the cup which is handed to the barista. Because there is mapping/association data between the "ABC" and the lion king, when the barista engages the "ABC" on the screen 260, the Lion King Image will print. Thus, in this example, when the barista receives the cup it will be clear that s/he needs to generate a hot chocolate using production machine 310 and then select the 'ABC' code to print the image on printer 340.

From this simple use case we see that in a retail environment (e.g. from many customer, each specifying his/her own customized drink) where there are multiple types of drinks generated by production machine 310, use of the text code helps the staff print the 'correct image' on the 'correct drink.'

In the above example, there was no need for client device 100 to specify the contents of the drink—only the image. In other examples, client device 100 may specify the contents of the drink (i.e. the s/he wants a cappuccino or a hot chocolate)—for example, if production machine 310 and printer 340 are integrated into a single machine, the cashier would just write "Robert XYZ" on the cup and the barista would just select the "XYZ" option. In this example, the code "XYZ" would map both to the contents of the drink and to the image (e.g. Lion King image).

Use Case B (FIGS. 3-6)

Figure 4:
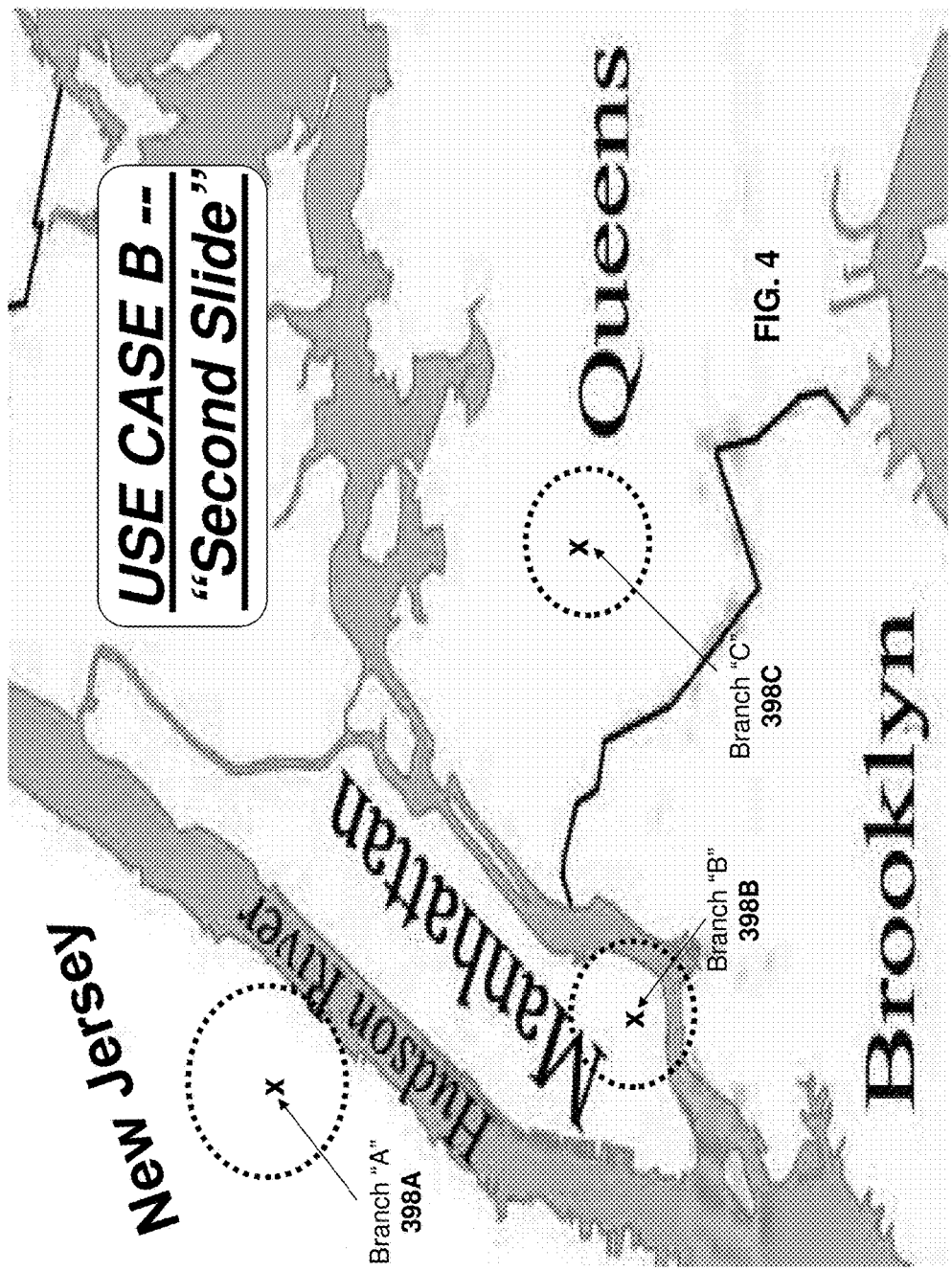

This case relates to a chain of coffee shops having branches in various geographic locations. As shown in FIG. 4 this may include branch A 398A in New Jersey, branch B 398B in downtown (i.e. North) Manhattan and branch C 398C in Queens.

Each branch has its own set of one or more drink printer(s) therein. In FIG. 3, the user uploads and/or specifies an image to print (e.g. "I love you" in a heart) and mapping server 200 assigns code "Q" to the image specified via Client Device 100. Optionally, the code 'Q' is sent to client device 100.

As shown in FIG. 5A, the user is in uptown Manhattan at the time the image is uploaded and/or specified at time t1.

At a later time t2 (FIG. 5B) the user drives to the New Jersey branch—in response to the user going into geographic proximity with the Branch A 398A, code "Q"

appears on GUI of printer 400A in Branch A 398A (e.g. on screen 260 of printer 400A) and the 'mapping data' between the image (e.g. "I love you" in the heart) provided by device 100 at time t1 is available at time t2 to printer 400A in branch 398A. Thus, at time t2 if an operator selects code "Q" in branch A 398A the image "I love you in a heart" is printed onto the drink—however, at time t2 the code "Q" either does not appear on the display screen of printers 400B-400C in branches 398B-398C or is mapped to a different image.

As shown in FIG. 5C, at a later time t3 the user may not purchase the drink in 'branch A" and may instead travel to 'branch B"—at this time t3, the code 'Q" is either not available on the menu/GUI in 'branch A' 398A or mapped to a different image. At this time t3, if an operator selects code "Q" in branch B 398B the image "I love you in a heart" is printed onto the drink.\

Figure 6A:
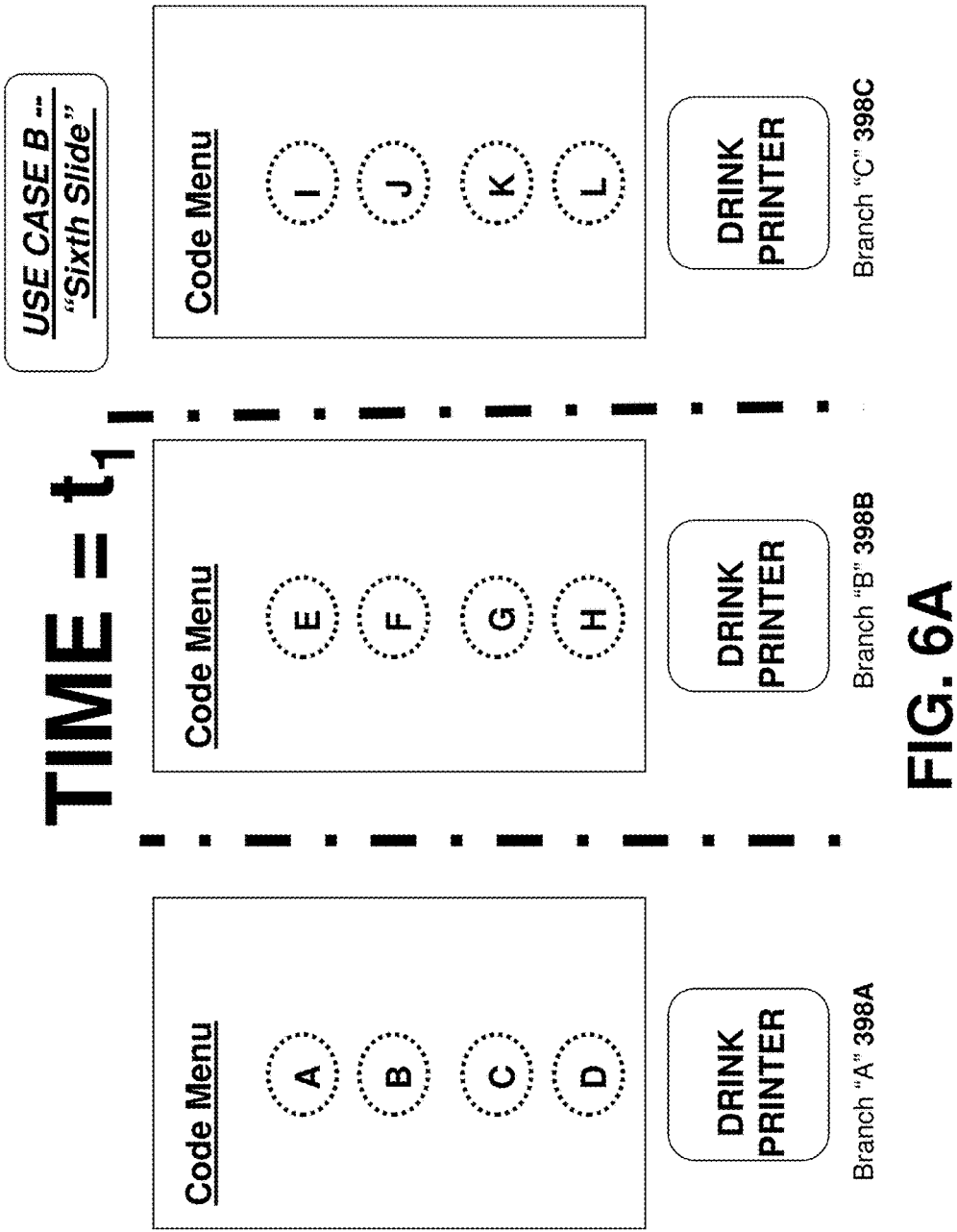
Figure 6B:
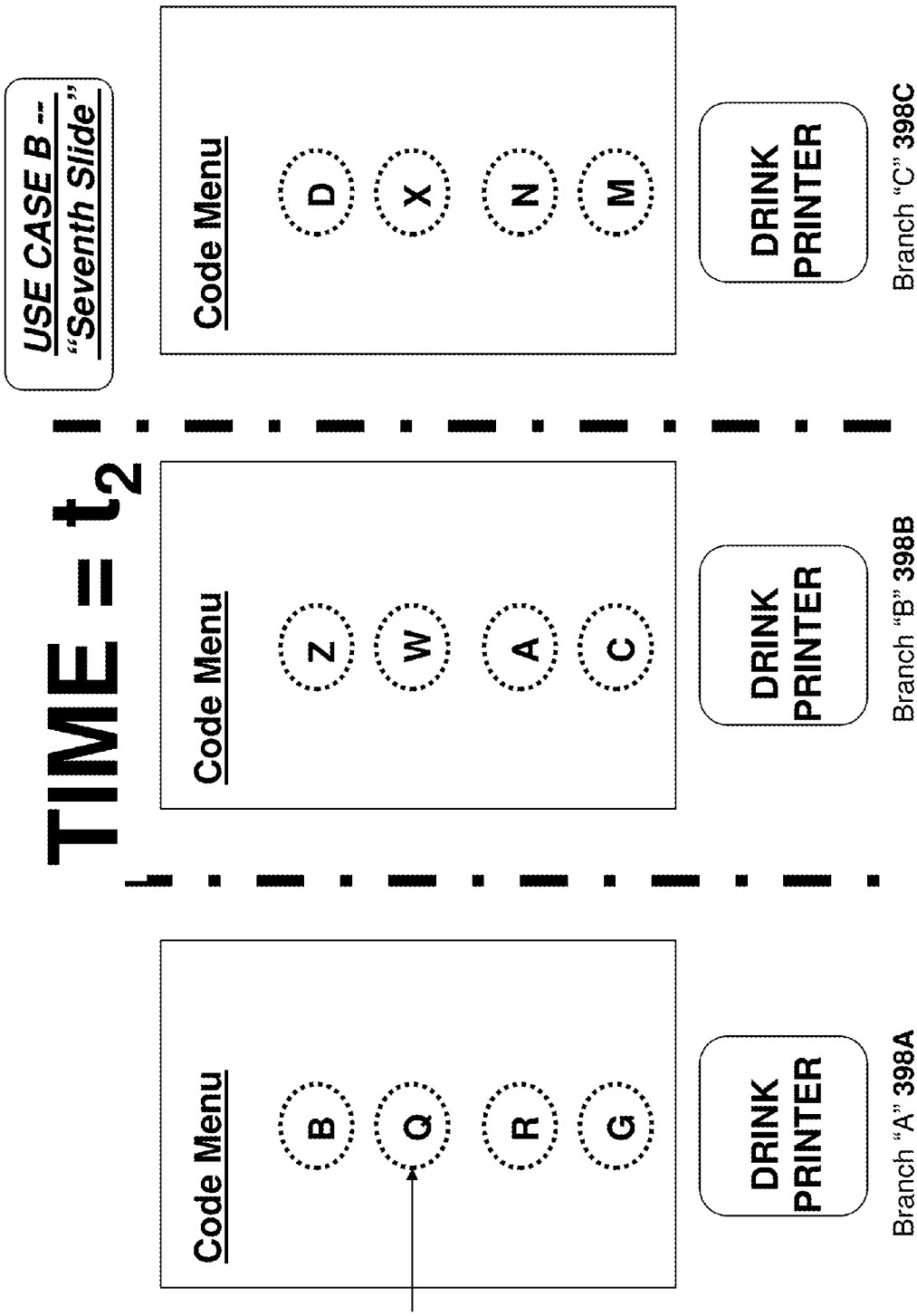
Figure 6C:
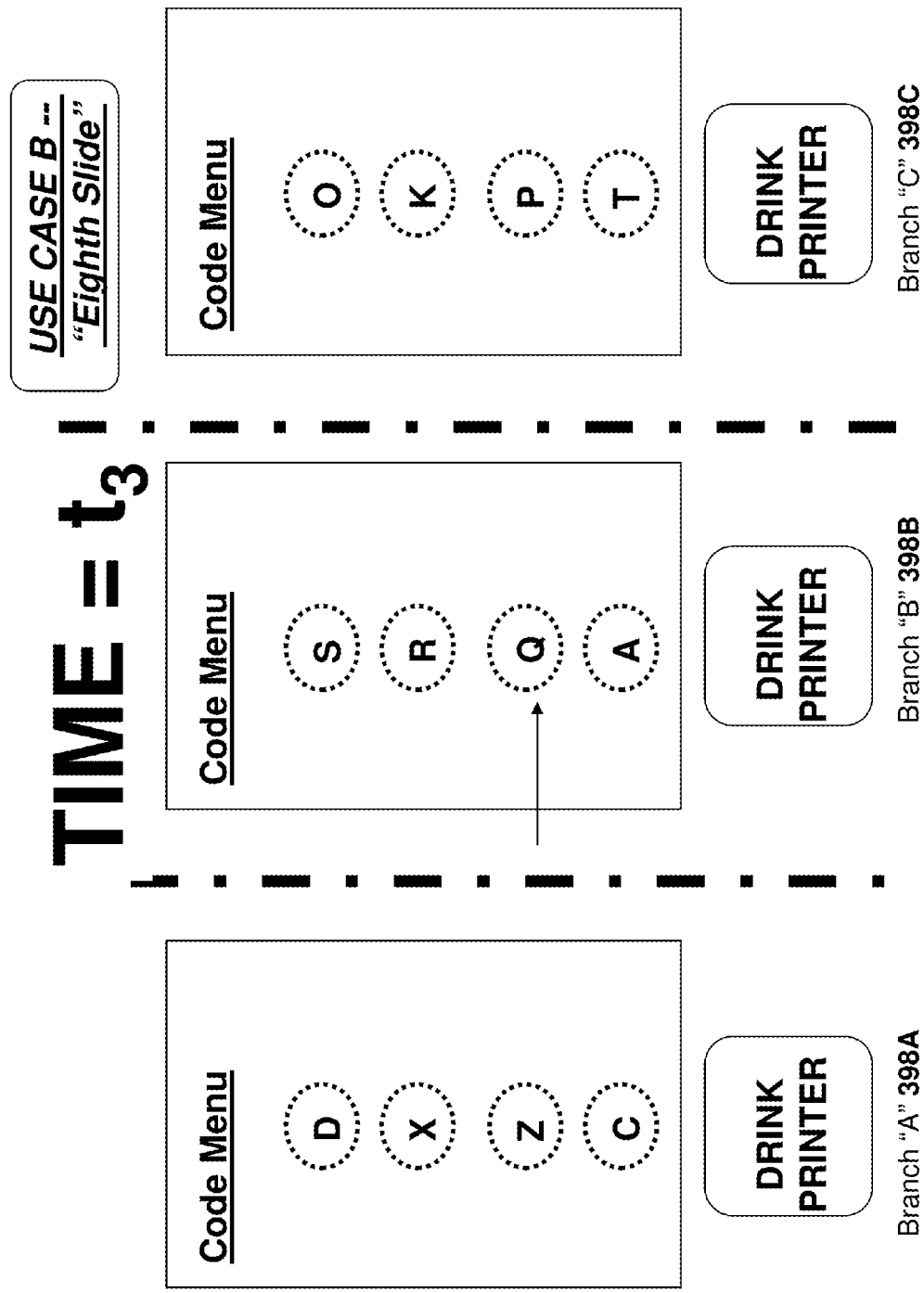

FIGS. 6A-6C illustrate the GUI/menus (e.g. on screens 260 of drink printers 400A, 400B and 400C respectively) at times t1-t3. Thus, initially, the 'Q' code does not appear on any menu. In FIG. 6B, in response to the user travelling to the vicinity of branch A 398A, the "Q" code of the user appears on the menu in "Branch A" 398A only (and is mapped to the 'I love you image" only for the printers in branch A 400A). In FIG. 6C, in response to the user travelling to the vicinity of branch B 398B, the "Q" code of the user appears on the menu in "Branch B" 398B only (and is mapped to the 'I love you image" only for the printers in branch B 400B).

In one implementation, when the user uploads and/or specifies the image in FIG. 3, an identifier of the user's specific client device 100 or of a "SIM" thereof is also mapped to the image and the text code. For example, in FIG. 3 the client device may have device ID "IDXYZ." The location of the device 100 (or SIM) can be tracked and when it is reported to 'code server' that device 100 having device ID "IDXYZ" is in the 'vicinity of branch A,' the code 'Q' (i.e. which is associated with both "IDXYZ" and the "I love you image") is available on the GUI of printer 400A in branch A 398A and associated with the "I love you image."

Use Case C (FIGS. 7A-7D)

Figure 7C:
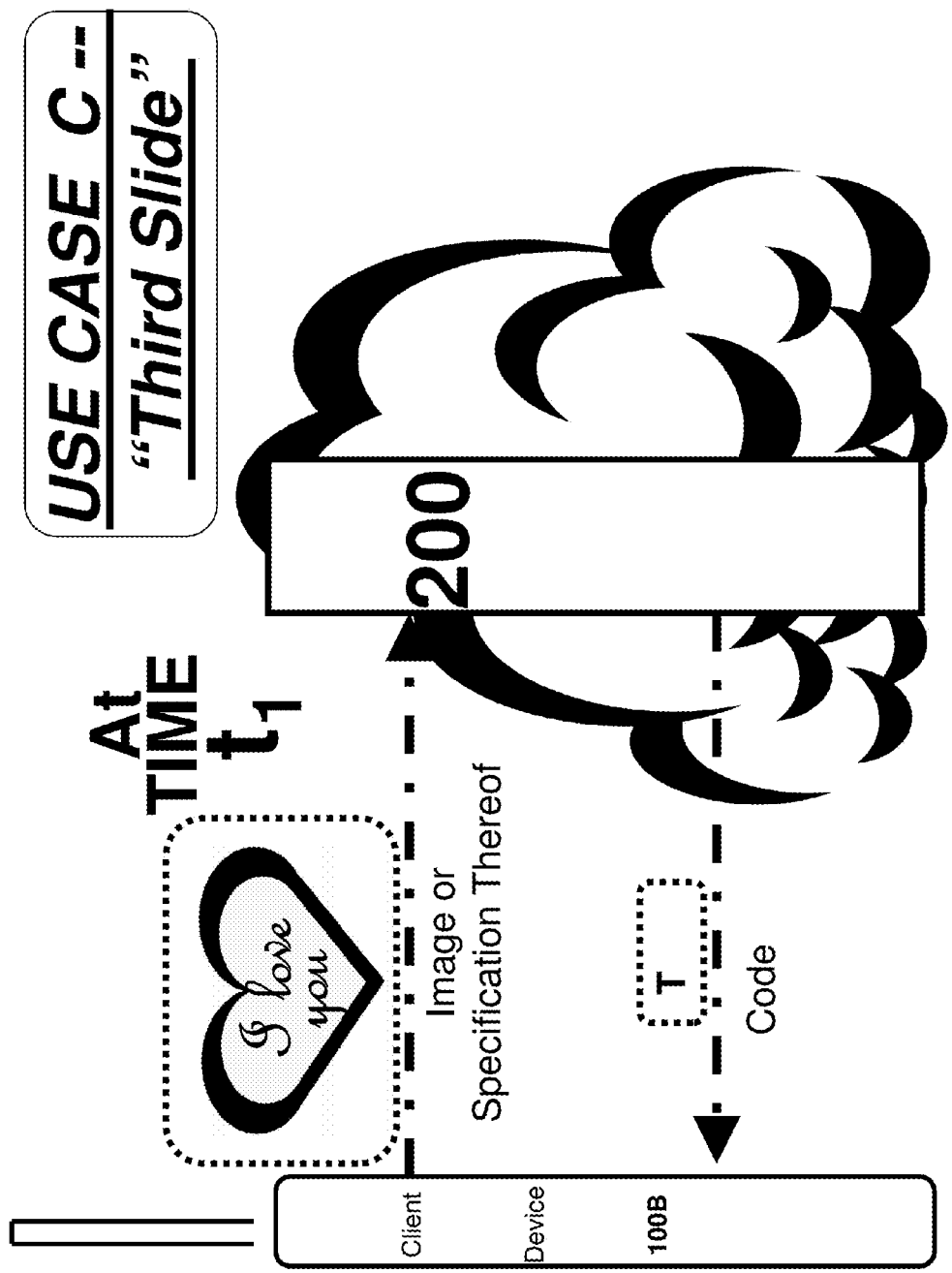
Figure 7D:
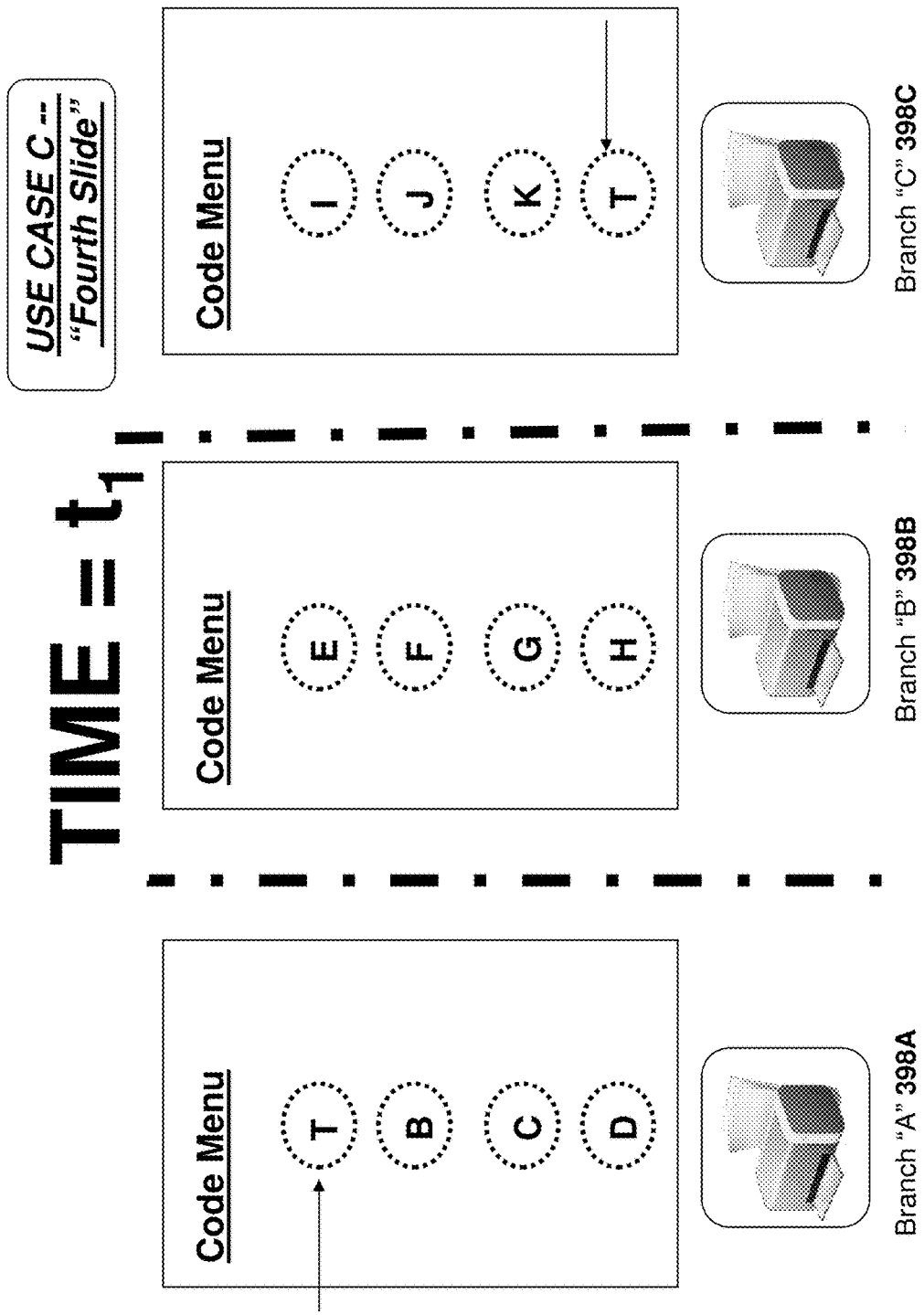

In this use case, there are two users—a first user having terminal 100A in branch A 398A at time t1, and a second user having terminal 100B in branch C 398C at time t1. As shown in FIGS. 7B-7C, the first user wishes to print a 'happy birthday' image and is provided with code "T"—the second user wishes to print an 'I love you' image and is provided with code "T"—these are 'clashing codes.' Allowing for 'Clashing codes' between different geographic locations/branches may be advantageous because this allows for shorter codes. As shown in FIG. 7D, the clashing codes are handled according to geographical locations—in Branch A 398A engagement of the "T" code will provided the happy birthday' image because the client device 100A is in branch A 398A, and in Branch C 398C engagement of the "clashing" "T" code will provided the "I love you" image because the client device 100C is in branch A 398C—these images are specified and/or generated and/or uploaded by different client devices and this information is tracked and used to populate and/or specify the image printed by a code of the GUI.

Thus, the 'activity' of the code 'follows' the client device 100 which generates and/or specifies and/or uploads the image.

FIGS. 8A-8B

Figure 8A:
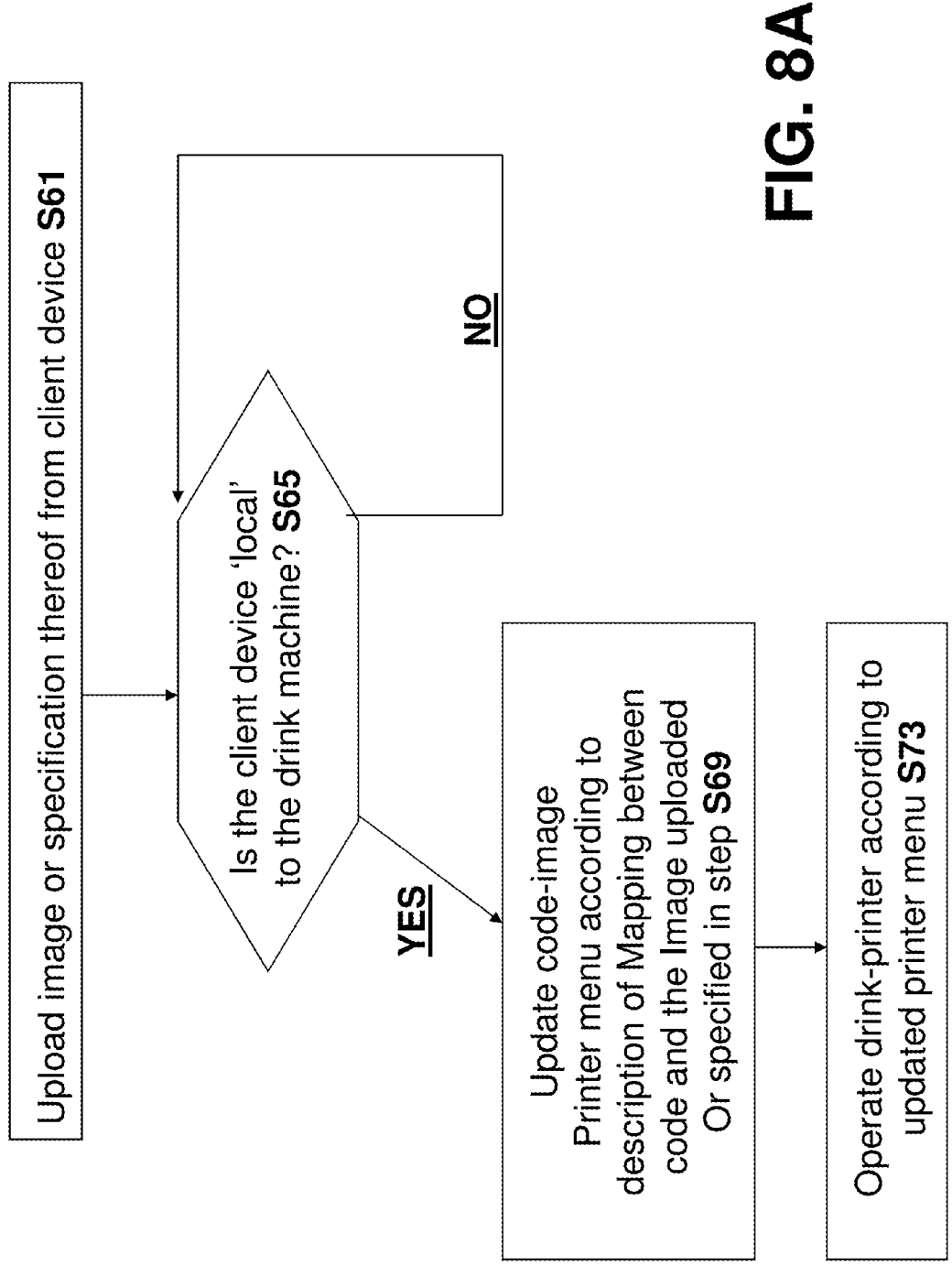

FIGS. 8A-8B are flow-charts of methods of operating drink printers and client devices. Thus, in FIG. 8A, only if the client device 100 is 'local' (e.g. according to geographic proximity—this can be pre-defined) to a drink machine does the code specified by client device 100 appear in the GUI of printer 400 (or appear as 'mapped' to the image specified by client device 100). Steps illustrated in FIG. 8A are S61, S65, S69 and S73. In FIG. 8B, as the client device which specified the image moves into the vicinity of a printer 400, its code becomes available and/or active on a display screen 260 thereof. Steps illustrated in FIG. 8B are S81, S85, and S89.

A Discussion of FIGS. 9-11

Figure 9B:
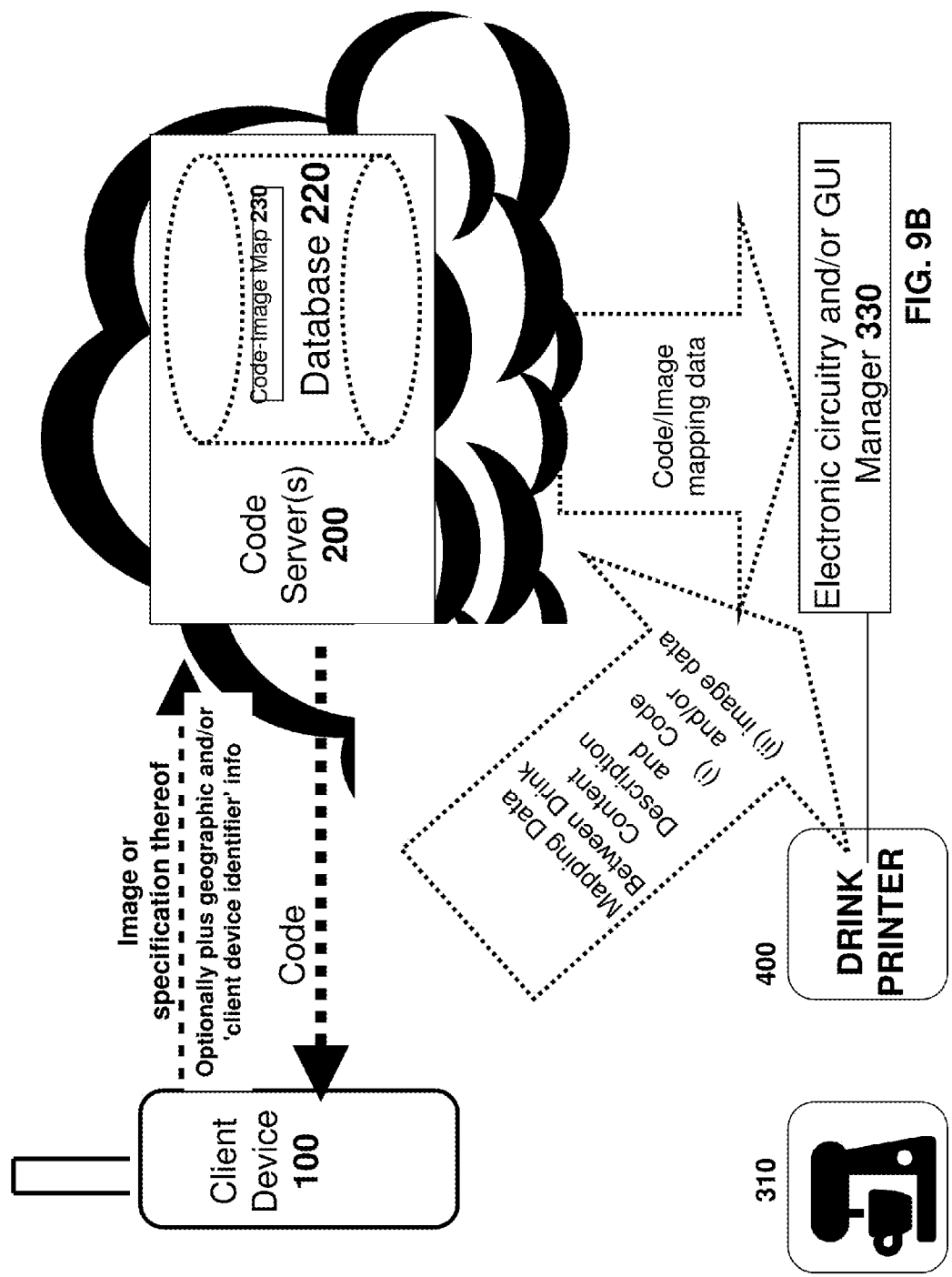

In the example of FIGS. 9-11, the client device may also specify information about the content of the drink itself. In one example, client device 100 would specify 'Lion King Image' on "hot chocolate drink. Thus, comparing FIG. 9A to FIG. 2, in FIG. 9A the code is associated with both a digital image to be printed and a description of the content of the drink. In the example of FIG. 9B, the content of the image is specified by client device 100 (as in FIG. 2) but additional data about the 'content of the drink' is required to be provided not together with the 'image data' but in any manner.

Thus, mapping and/or association data between (i) a code (e.g. text code) (ii) content of the drink and (iii) the image to be printed is available to a GUI manager. In the example of FIG. 10, the same drink printer is used to print both on coffee and on beer—it is desired to avoid situations where the barista would print on the 'wrong drink.' Thus, if the user wishes to select code AD34, s/he would place the cup beneath the nozzles of drink printer 400, and by engaging code 'AD34' the image mapped to code 'AD34' would be printed. In a retail/restaurant environment when there is a need for a barista to print on many different types of drinks (i.e. the same printer can be used to print both on coffee and on beer) without 'mixing up' between drinks, the user interface of FIG. 10 provides the following feature—if according to the 'specification of the content of the drink' and the 'digital image' to print (see FIGS. 9A-9B), a given image (i.e. according to he drink order) should be printed on coffee, the text code is circled with a 'solid line code'; if on the other hand according to the 'specification of the content of the drink' and the 'digital image' to print (see FIGS. 9A-9B), a given image (i.e. according to he drink order) should be printed on beer, the text code is circled with a 'broken line code.'

Thus, before selecting a particular code, the barista may check the actual drink beneath the nozzle (i.e. if it is beer or coffee)—if the drink is coffee, the barista will be careful not to select a code circled by a broken line and if the drink is beer, the barista will be careful not to select a code circled by a solid line.

FIG. 11 describes this process and includes steps S201, S205, S209 and S213. Thus, in step S209, the menu on screen 260 of printer 400 includes information describing an association between the code (e.g. text code) and the content of the drink where the image is to be printed (i.e. beer vs. coffee). When a 'drink order' specifies a particular image (e.g. 'I love you") on coffee, the code (e.g. text-code) for the image appears on the menu of screen 260 visually associated with a 'coffee' indicator (i.e. a rough description of the content of the drink—the coffee indicator is circled by solid line). When a 'drink order' specifies a particular image (e.g. 'Happy Birthday") on beer, the code (e.g. text-code) for the image appears on the menu of screen 260 visually associated with a 'beer' indicator (i.e. a rough description of the content of the drink—the beer indicator is circled by broken line).

Thus, the technique of FIGS. 9-11 may reduce the likelihood that even in a retail environment a barista would erroneously print a given image (i.e. by engaging it's text code) on the wrong drink.

A 'drink-property heterogeneous menu' show keys and/or codes for images to print that are intended and/or targeted for different types of drinks. Thus, if a first image is targeted to print on a coffee beverage (e.g. 'targeted' according to step S205) and if a second image is targeted to print on a beer beverage (e.g. 'targeted' according to step S205) a menu from which the user can specify the first image as well as the second image is a 'drink-property heterogeneous menu.' In contrast, if all images are targeted to be printed on an identical type of drink (e.g. all 'large cappuccinos') this is a 'drink-property homogeneous menu.' Thus, the code menu of FIG. 10 is a 'drink-property heterogeneous menu.'

A printing device for printing on a current drink comprising: a. a tray upon which the current drink rests; b. an ink-jet printer to downwardly ink-jet droplets of ink towards the tray to print an image on the drink supported by the tray; c. a display-screen; d. a mapped drink-code database specifying a map for a plurality of drink-printing codes, between: i. each displayed drink-printing code of the plurality of drink-printing codes; and ii. a respective combination of (i) a respective drink-printing-code-specific target-image to be printed by the ink-jet printer; and (ii) respective drink-printing-code-specific target-drink property-data describing a contents of respective target-drink and/or its container; e. a user-interface for: i. displaying a menu comprising the plurality of drink-printing codes drink-property-heterogeneous on the display-screen such that each drink code is displayed in a manner specific to the respective target-drink property-data associated therewith; and i. receiving a user-selection of one of the drink codes to thereby user-specify, according to the mapped drink-code database, a target-image; a device controller for responding to the user drink-code selection, in accordance with content of the mapped drink-code database, output of the sensor(s) and output of the analysis circuitry, by printing the user-interface-specified target-image onto an upper surface of the current drink.

In the example of FIG. 10, each drink code is displayed in a manner specific to the respective target-drink property-data associated therewith—thus, codes AD34 and 232A are displayed within a solid line indicating 'coffee' while codes 9ZA2 and GHPQ are displayed within a broken line/oval indicating 'beer.' In other examples, the codes may be colored differently—e.g. red characters where the target drink is coffee and blue characters where the target drink is beer. In another example, a different font (e.g. Geneva vs. Times-New-Roman) or font-size (e.g. 12 point vs. 16 point) is used for beer-codes and coffee-codes.

A Discussion of FIGS. 12-13

The example of FIGS. 12-13 describe a technique which also is useful for reducing the likelihood that even in a retail environment a barista would erroneously print a given image (i.e. by engaging it's text code) on the wrong drink.

Figure 13B:
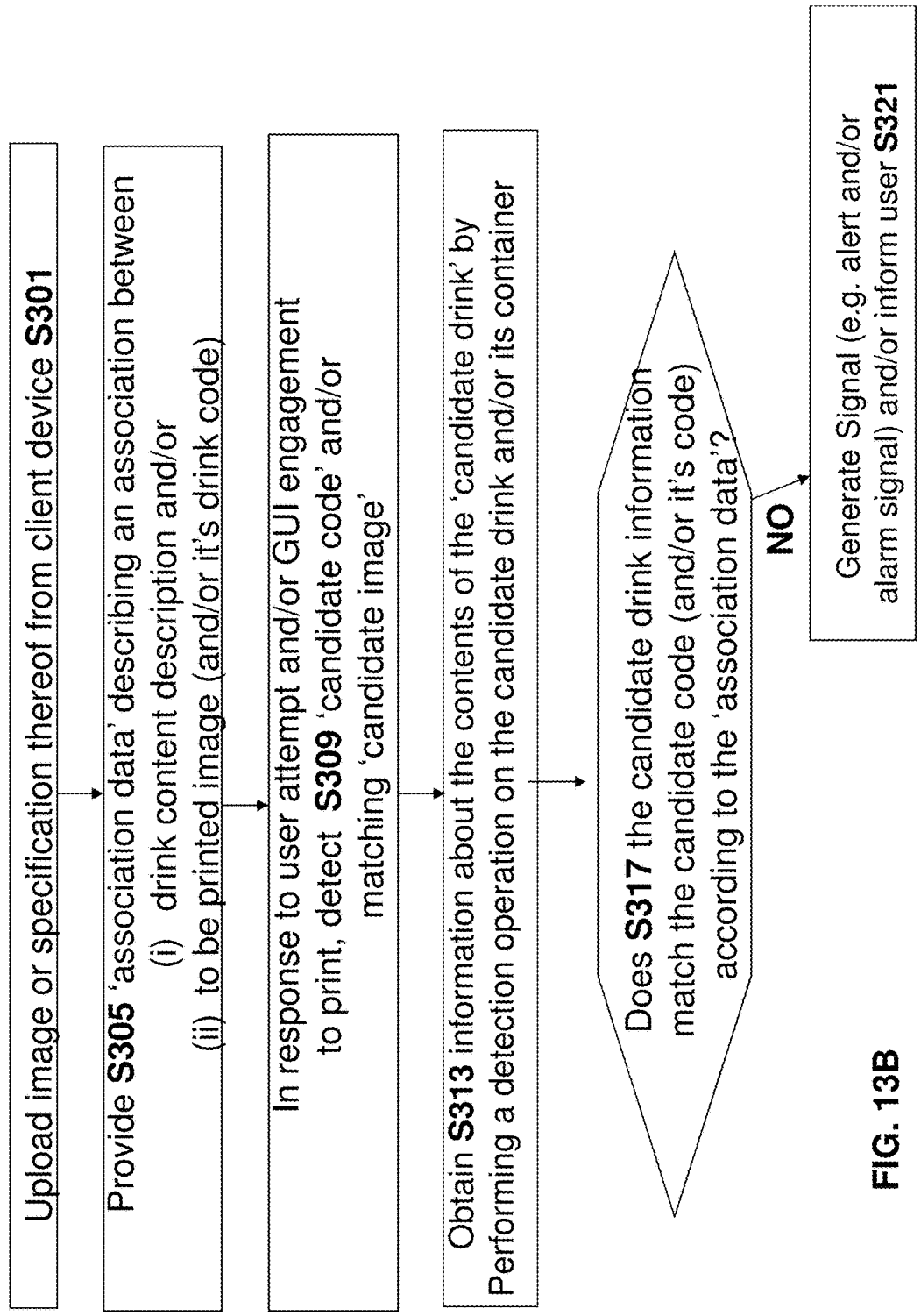

FIGS. 13A-13B include steps S301, S305, S309, S313, and S317. Step 13B also includes steps S321.

Figure 12A:
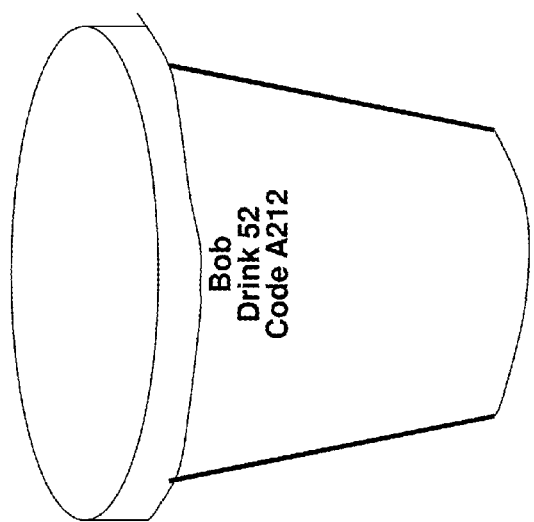

In FIG. 12A, the cashier specified that a drink is 'Drink Code 52' (i.e. in a certain coffee shop, barista might understand '52' to relate to Frappuccino. In FIG. 12B, the printer has a camera 520 which can take a picture of the outside of the cup—this data can be decoded using Optical Character Recognition (OCR) technology to 'read.'

From FIGS. 9A-9B, the printer (or circuitry in communication therewith) 'knows' that the user specified a drink order to print image having code A212 on a Frappuccino.

The data from FIGS. 9A-9B can be matched to the OCR data—if they match this is a sign that the barista has placed the 'correct drink' on the printer—thus, the user-specified drink order (e.g. specified in part or entirely by terminal 100) specifies that a specific image is printed on a drink having a specific content (see step S301-S305 of FIG. 13A). In step S209, when the barista presses code 'A212' the device can (i) make sure that drink having code 'A212' written on the side is in fact 'loaded' onto the printer (e.g. using the OCR technology) and/or (ii) make sure that the drink whose content is specified by code '52' is loaded on the printer.

In different embodiments, the OCR may read any text written on the side of the cup and may assess and/or may determine from the text on the side of the cup 'current drink property(ies).' In the example of FIG. 12A, this may from the word Bob (i.e. who usually orders cappuccino) and/or from the 'Drink 52' (i.e. which is usually associated with a cappuccino) and/or from "Code A212' (i.e. which is associated within the mapping and/or database with 'cappuccino').

In FIG. 13A, printing on the content of the drink is only 'permitted' if the drink actually detected to be 'on the printer' matches the content specified in the order (e.g. see FIGS. 9A-9B).

Thus, in step of S217 the printing is in a manner that is 'contingent upon' the drink-match parameter this means that only if the drink-match parameter meets certain criteria (e.g. indicative of a 'good match'—e.g. a score above a certain threshold) does the device controller permit printing and/or does the device controller responds to the user-selection of a drink code by instructing the ink-jet printer to print the image.

Alternatively or additionally (see FIG. 13B), if there is a 'mismatch' an alert or alarm signal (e.g. visual and/or audio) may be generated to 'warn' the barista not to print on a particular drink.

The example of FIGS. 12A-12B relate to the specific example where information on the container 490 (e.g. text written thereon) is used to identify the 'content' of the drink (i.e. the 'candidate beverage' the barista has placed on the tray 470 and therefore might print thereon by pressing the 'candidate code' from the menu on screen 260).

Alternatively or additionally, information about the contents of the drink may be obtained not from the container and/or writing thereon but from one or more (i.e. any combination) of the following technique: a temperature sensor may measure the temperature (e.g. IR sensor) of the drink—e.g beer is cold but coffee is hot—if the 'drink order data' (see FIGS. 9A-9B) indicate that the drink associated with code "ABCD" is beer, when the barista selects the code "ABCD" the temperature of the 'candidate drink' on the tray is measured—if the temperature is 'hot' then the drink is clearly not beer and an alert and/or alarm signal is generated or the printer just will not allow printing.

In another example another camera (now shown) may be stationed next to cartridge 430 looking 'down'—since the color of coffee is different from that of 'beer' if the user attempts to choose the code for a drink (i.e. according to the drink order) that is supposed to be coffee but the 'down-looking camera' shows to be beer, then the alert will be provided.

Some embodiments relate to a printing device for printing on a current drink comprising: a. a platform (e.g. tray—elevatable tray having a variable elevation that is controlled by a motor) upon which the current drink rests; b. an ink-jet printer (e.g. thermal inkjet and/or bubble-jet) to downwardly ink-jet droplets of ink towards the tray to print an image on the drink supported by the tray; c. a display-screen; (e.g. disposed above the tray and/or above a nozzle of the ink-jet printer) d. one or more sensor(s) for acquiring current-drink property-data describing the current drink currently supported by the platform (e.g. tray) and/or beneath a print-head of the ink-jet printer e. a mapped drink-code database specifying a map for a plurality of drink-printing codes, between: i. each displayed drink-printing code of the plurality of drink-printing codes; and ii. a respective combination of (i) a respective drink-printing-code-specific target-image to be printed by the ink-jet printer; and (ii) respective drink-printing-code-specific target-drink property-data describing contents of a respective target-drink and/or its container; f. analysis circuitry for computing a drink-match parameter between: i. property-data of the current drink sensed by the sensor(s) and ii. property-data of one or more of the target drinks specified by the database; g. a user-interface for: i. displaying a drink-property-heterogeneous menu comprising the plurality of drink-printing codes on the display-screen; an ii. receiving a user-selection of one of the drink codes to thereby user-specify, according to the mapped drink-code database, a target-image and target-drink property-data; h. a device controller for responding to the user drink-code selection, in accordance with content of the mapped drink-code database, output of the sensor(s) and output of the analysis circuitry, by printing the user-interface-specified target-image onto an upper surface of the current drink in a manner that is contingent upon the drink-match parameter that is specific to the combination of: i. the user-specified target-drink property-data as specified via the user-interface; ii. the current drink property-data as sensed by the sensor(s).

In some embodiments, the sensor is an image sensor configured to acquire a digital image of an outer wall of a container of the current drink resting on the platform (e.g. tray).

In some embodiments, the analysis circuitry is configured to subject the acquired digital image to optical-character-recognition (OCR) analysis derive therefrom the target-drink property-data.

Additional Embodiments

In some embodiments, instead of writing the drink code (e.g. '52' is Frappuccino) on the side of the cup, a drink-ordering computer (e.g. cash-register in the coffee shop) might print this code to a printer (e.g. on paper)—e.g. near machine 310. In this case, it might be possible to augment the printed code as follows—the user can show the 'image code' to the cashier would could print it from the 'order-generating cmoputer' together with the 'drink code'—thus, it would state 'Drink 52 Image XYZ"—this would be printed on paper. The barista would take the small portion of paper containing 'Drink 52 Image XYZ" and s/he would know (i) first generate drink 310 using machine 310 and (ii) then select the option 'XYZ' from the menu to print the image associated with text code 'XYZ.'

A method of providing a customized drink, the method comprising; a. maintaining, in computer memory, a text-image map between textual image-keys and digital graphical images; b. in response to an uploading of a digital graphical image, updating the text-image map to include a mapping between the uploaded digital graphical image and a machine-generated textual image-key for the uploaded graphical image; c. receiving, via user-input device of an order-generating computer-terminal, both a drink description and a user-supplied textual image-key; d. electronically sending, from the order-generating computer-terminal to one or more production machines of a drink-production machine-array, a text-hybrid of the (i) a drink text-code matching the drink description and (ii) the user-supplied textual image-key; e. visually displaying, on a display-screen of one or more drink-production machines, the text-hybrid; f. responding to a user input: (i) to one or more of the drink-production machines and (ii) of data matching the drink-text-code of the textual-hybrid, by electronically generating a drink that matches the drink-text-code; and g. responding to a user input (i) to one or more of the drink-production machines and (ii) of data matching the user-supplied textual image-key of the textual hybrid, by printing on the drink and in edible-media, the digital graphical image that matches, according to the text-image map, the user-supplied textual image-key.

What is claimed:

1. A printing device for printing on a current drink comprising:
   a. a tray upon which the current drink rests;
   b. an ink-jet printer to downwardly ink-jet droplets of ink towards the tray to print an image on the drink supported by the tray;
   c. a display-screen;
   d. one or more sensor(s) for acquiring current-drink property-data describing the current drink currently supported by the tray;
   e. a mapped drink-code database specifying a map for a plurality of drink-printing codes, between:
      i. each displayed drink-printing code of the plurality of drink-printing codes; and
      ii. a respective combination of (i) a respective drink-printing-code-specific target-image to be printed by the ink-jet printer; and (ii) respective drink-printing-code-specific target-drink property-data describing contents of a respective target-drink and/or its container;
   f. analysis circuitry for computing a drink-match parameter between:
      i. property-data of the current drink sensed by the sensor(s) and
      ii. property-data of one or more of the target drinks specified by the database;
   g. a user-interface for:
      i. displaying a drink-property-heterogeneous menu comprising the plurality of drink-printing codes on the display-screen; and
      ii. receiving a user-selection of one of the drink codes to thereby user-specify, according to the mapped drink-code database, a target-image and target-drink property-data;
   h. a device controller for responding to the user drink-code selection, in accordance with content of the mapped drink-code database, output of the sensor(s) and output of the analysis circuitry, by printing the user-interface-specified target-image onto an upper surface of the current drink in a manner that is contingent upon the drink-match parameter that is specific to the combination of:
      i. the user-specified target-drink property-data as specified via the user-interface;
      ii. the current drink property-data as sensed by the sensor(s).

2. The system of claim 1 wherein the sensor is an image sensor configured to acquire a digital image of an outer wall of a container of the current drink resting on the tray.

3. The system of claim 2 wherein the analysis circuitry is configured to subject the acquired digital image to optical-character-recognition (OCR) analysis derive therefrom the target-drink property-data.

4. A printing device for printing on a current drink comprising:
   a. a tray upon which the current drink rests;
   b. an ink-jet printer to downwardly ink-jet droplets of ink towards the tray to print an image on the drink supported by the tray;
   c. a display-screen;
   d. a mapped drink-code database specifying a map for a plurality of drink-printing codes, between:
      i. each displayed drink-printing code of the plurality of drink-printing codes; and
      ii. a respective combination of (i) a respective drink-printing-code-specific target-image to be printed by the ink-jet printer; and (ii) respective drink-printing-code-specific target-drink property-data describing a contents of respective target-drink and/or its container;
   e. a user-interface for:
      i. displaying a menu comprising the plurality of drink-printing codes drink-property-heterogeneous on the display-screen such that each drink code is displayed in a manner specific to the respective target-drink property-data associated therewith; and
      ii. receiving a user-selection of one of the drink codes to thereby user-specify, according to the mapped drink-code database, a target-image;
   f. a device controller for responding to the user drink-code selection, in accordance with content of the mapped drink-code database, output of the sensor(s) and output of the analysis circuitry, by printing the user-interface-specified target-image onto an upper surface of the current drink.

5. A method of providing a customized drink by a plurality of drink-manufacturing machines, each drink-manufacturing machine deployed at a different respective location and including and/or being locally coupled to a different respective display-screen, the method comprising:
   a. maintaining, in computer memory, a code-image map between code image-keys and digital graphical images
   b. in response to an uploading from a user-terminal, of a digital graphical image or a specification thereof:
      A. updating the code-image map to include a mapping between (i) a code-image key specific to the digital graphical image and (ii) uploaded digital graphical image of specification thereof and optionally an identifier of the user-terminal; and
      B. sending the code image key to the user terminal;
   c. monitoring a location of the user-terminal;
   d. in accordance with the results of the monitoring, sending menu-command information to each of the drink-manufacturing machines to regulate the contents of a code-menu on each of the drink-manufacturing-machine-local screens such that:
      i. in response to a decrease in a distance between given one of the user terminals and a given one of the drink-manufacturing machines, adding or promoting a code image-key resident in the user terminal to or within a menu of the given one of drink-manufacturing machines; and
      ii. in response to an increase in a distance between given one of the user terminals and a given one of the drink-manufacturing machines, removing or demoting a code image-key resident in the user terminal from or within a menu of the given one of drink-manufacturing machines; and
   e. for each of the drink manufacturing machines, in response to a user-selection of one of the drink codes, printing on a drink its associated a target-image as defined by the a code-image map.

* * * * *